United States Patent
Hong et al.

(10) Patent No.: US 12,429,720 B2
(45) Date of Patent: Sep. 30, 2025

(54) METHOD OF INSPECTING DISPLAY SUBSTRATE

(71) Applicant: Samsung Display Co., LTD., Yongin-si (KR)

(72) Inventors: Kwang Taek Hong, Yongin-si (KR); Jun Yeong Park, Yongin-si (KR); Hwa Sung Woo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 96 days.

(21) Appl. No.: 18/115,962

(22) Filed: Mar. 1, 2023

(65) Prior Publication Data
US 2023/0280606 A1 Sep. 7, 2023

(30) Foreign Application Priority Data
Mar. 2, 2022 (KR) .................. 10-2022-0026978

(51) Int. Cl.
G02F 1/13 (2006.01)
G01N 21/95 (2006.01)

(52) U.S. Cl.
CPC .......... *G02F 1/1309* (2013.01); *G01N 21/95* (2013.01); *G01N 2021/9513* (2013.01)

(58) Field of Classification Search
None
See application file for complete search history.

(56) References Cited

U.S. PATENT DOCUMENTS

| | | | |
|---|---|---|---|
| 9,076,193 B2 | 7/2015 | Kwon et al. | |
| 9,159,258 B2* | 10/2015 | Lee | G09G 3/006 |
| 2015/0003720 A1* | 1/2015 | Kwon | G06T 7/0004 |
| | | | 382/147 |
| 2019/0149757 A1* | 5/2019 | Yamasaki | H04N 25/68 |
| | | | 348/247 |

FOREIGN PATENT DOCUMENTS

| | | |
|---|---|---|
| KR | 10-0933467 | 12/2009 |
| KR | 10-0969349 | 7/2010 |
| KR | 10-2015-0001094 | 1/2015 |

* cited by examiner

*Primary Examiner* — Jermele M Hollington
(74) *Attorney, Agent, or Firm* — Womble Bond Dickinson (US) LLP

(57) ABSTRACT

A method of inspecting a display substrate including pixel patterns provided in pixel areas disposed in a display area in a first direction and a second direction may include obtaining a captured image of the pixel patterns of the display substrate, grouping pixels included in the captured image by grouping at least two pixels disposed in the first direction into a pixel group, designating each pixel group included in the captured image as a target pixel group, comparing pixel patterns of the target pixel group with pixel patterns of an adjacent pixel group positioned in a third direction with respect to the target pixel group, and determining whether the pixel patterns of the target pixel group are defective.

21 Claims, 18 Drawing Sheets

PXG: PXG0, PXG1, PXG2, PXG3, PXG4

METHOD OF INSPECTING DISPLAY SUBSTRATE

CROSS-REFERENCE TO RELATED APPLICATION(S)

This application claims priority to and benefits of Korean Patent Application No. 10-2022-0026978 under 35 U.S.C. § 119, filed on Mar. 2, 2022 in the Korean Intellectual Property Office, the entire contents of which are herein incorporated by reference.

BACKGROUND

1. Technical Field

Embodiments of the disclosure relate to a method of inspecting a display substrate.

2. Description of the Related Art

Recently, interest in information display is increasing. Accordingly, research and development of a display device has been continuously conducted.

SUMMARY

A technical aspect of the disclosure is to provide a method of inspecting a display substrate including pixel patterns of different shapes.

Aspects of the disclosure are not limited to the above-described aspect, and other technical aspects that are not described will be clearly understood by those skilled in the art from the following description.

A method of inspecting a display substrate including pixel patterns provided in pixel areas disposed in a display area in a first direction and a second direction may include obtaining a captured image of the pixel patterns of the display substrate, grouping pixels included in the captured image by grouping at least two pixels disposed in the first direction into a pixel group, designating each pixel group included in the captured image as a target pixel group, comparing pixel patterns of the target pixel group with pixel patterns of an adjacent pixel group positioned in a third direction with respect to the target pixel group, and determining whether the pixel patterns of the target pixel group are defective.

In an embodiment, the third direction may be an oblique direction inclined with respect to the first direction and the second direction.

In an embodiment, the first direction may be a vertical direction of the display area, and the second direction may be a horizontal direction of the display area.

In an embodiment, the adjacent pixel group may include at least one of a first pixel group positioned at a side of the target pixel group to be directly adjacent to the target pixel group in the third direction, a second pixel group positioned at another side of the target pixel group to be immediately adjacent to the target pixel group in the third direction, a third pixel group immediately adjacent to the first pixel group in the third direction, and a fourth pixel group immediately adjacent to the second pixel group in the third direction.

In an embodiment, at least one of the first pixel group, the second pixel group, the third pixel group, and the fourth pixel group, and the target pixel group may include pixel patterns of a same shape.

In an embodiment, the comparing of the pixel patterns of the target pixel group with the pixel patterns of the adjacent pixel group may include comparing the pixel patterns of the target pixel group with pixel patterns of the first pixel group to determine whether the pixel patterns match.

In an embodiment, in case that the pixel patterns of the target pixel group match the pixel patterns of the first pixel group, it may be determined whether the pixel patterns of the target pixel group are defective based on the pixel patterns of the first pixel group.

In an embodiment, in case that the pixel patterns of the target pixel group and the pixel patterns of the first pixel group do not match, the pixel patterns of the target pixel group may be sequentially compared with pixel patterns of the second pixel group, the third pixel group, and the fourth pixel group, and in case that the pixel patterns of the second pixel group, the third pixel group, or the fourth pixel group match the pixel patterns of the target pixel group, a pixel pattern comparison step may be stopped.

In an embodiment, it may be determined whether the pixel patterns of the target pixel group are defective, based on the pixel patterns of the second pixel group, the third pixel group, or the fourth pixel group determined to match the pixel patterns of the target pixel group.

In an embodiment, the pixel areas may include first pixel areas in which first pixels may be disposed, and second pixel areas in which second pixels may be disposed. The pixel patterns may include first pixel patterns provided in the first pixel areas, and second pixel patterns provided in the second pixel areas and different from the first pixel patterns.

In an embodiment, the second pixel areas may be disposed in the third direction in at least one area of the display area.

In an embodiment, the pixel areas may further include third pixel areas in which third pixels may be disposed. The pixel patterns may further include third pixel patterns provided in the third pixel areas and different from the first pixel patterns and the second pixel patterns.

In an embodiment, the display area may include a vertical line on which any one of the second pixels may be disposed. The vertical line may include at least one first pixel disposed at a lower end of the second pixel, and at least one third pixel disposed at an upper end of the second pixel.

In an embodiment, the first pixel patterns may include conductive patterns configuring a pixel circuit of each of the first pixels, and a portion of lines disposed around each of the first pixels. The second pixel patterns may include conductive patterns configuring a pixel circuit of each of the second pixels, and a portion of lines disposed around each of the second pixels. The third pixel patterns may include conductive patterns configuring a pixel circuit of each of the third pixels, and a portion of lines disposed around each of the third pixels.

In an embodiment, the first pixel patterns may include a portion of each of a vertical power line and a vertical scan line extending in the first direction and separated from each other. The vertical scan line may be disconnected in any one of the second pixel areas.

In an embodiment, the third pixel patterns may include a portion of the vertical power line extending in the first direction and including at least two patterns connected to each other.

In an embodiment, the obtaining of the captured image may include obtaining a first captured image of a first area of the display area, and obtaining a second captured image of a second area of the display area. The first area and the second area may partially overlap each other in at least one of the first direction and the second direction.

In an embodiment, it may be determined whether pixel patterns included in each pixel group included in the first captured image are defective, based on the first captured image. It may be determined whether pixel patterns included in each pixel group included in the second captured image are defective, based on the second captured image.

Details of other embodiments are included in the detailed description and drawings.

In accordance with the method of inspecting the display substrate according to embodiments of the disclosure, a defect of the pixel patterns may be detected with respect to the display substrate including the pixel patterns that may not be periodic with respect to the first direction and the second direction in which the pixels may be arranged. For example, the defect of the pixel patterns may be appropriately detected by performing an optical inspection on the pixel patterns by applying a comparison method of the pixel patterns based on the third direction.

In an embodiment, in obtaining the captured image of the pixel patterns, the display substrate may be captured so that imaging areas partially overlap each other in the first direction and/or the second direction. Accordingly, the pixel patterns may be captured over the entire display area, and the optical inspection on the pixel patterns may be performed.

Effects according to the embodiments are not limited by the contents disclosed above, and additional effects are included in the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
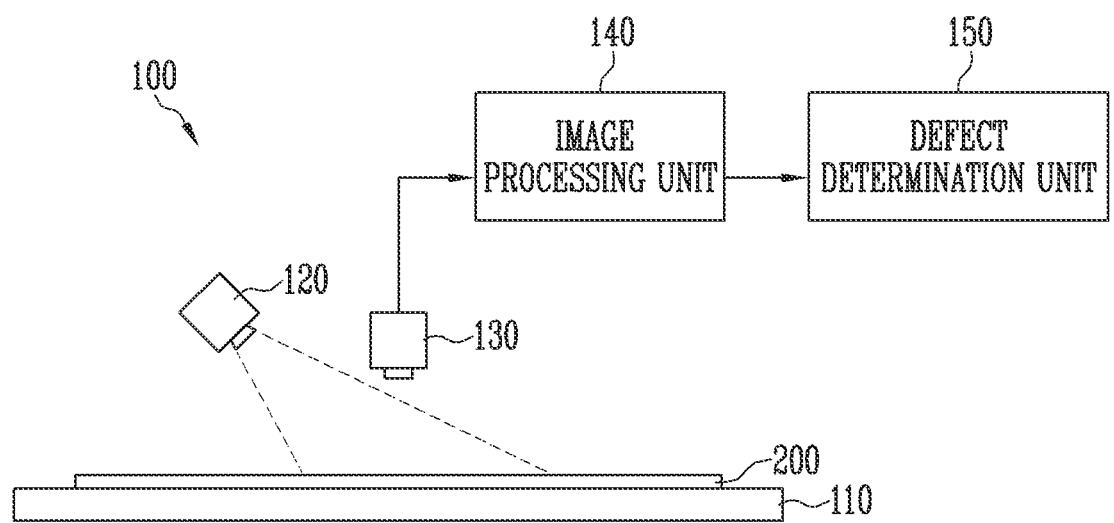
FIG. 1 is a configuration diagram schematically illustrating an inspection device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the following description, the singular forms also include the plural forms unless the context clearly includes otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Throughout the drawings, the same reference numerals are used as far as possible for configurations that are identical to or similar to each other, even though the configurations that are identical to or similar to each other are shown in different drawings. In describing embodiments of the disclosure with reference to drawings, redundant descriptions of configurations that are identical to or similar to each other will be omitted or simplified.

In describing embodiments of the disclosure, the term "connection" may refer to a physical connection and/or an electrical connection. The term "connection" may refer to a direct connection and an indirect connection, and may refer to an integral connection and/or a non-integral connection.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or to "not overlap" another element, this may include that the elements are spaced apart from each other, offset from each other, or set aside from each other or any other suitable term as would be appreciated and understood by those of ordinary skill in the art.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a configuration diagram schematically illustrating an inspection device 100 according to an embodiment of the disclosure. In an embodiment, the inspection device 100 may be an optical inspection device that may be used in an optical inspection for a display substrate 200.

Referring to FIG. 1, the inspection device 100 may include a stage 110, a lighting unit 120, an imaging unit 130, an image processing unit 140, and a defect determination unit 150.

The stage 110 may be an element for supporting an inspection object. For example, the display substrate 200 may be disposed and settled down (settled) on the stage 110.

In an embodiment, the display substrate 200 may be a thin film transistor substrate (or a back-plane substrate) on which circuit elements provided to pixels of a display device and lines connected to the pixels may be formed. For example, the display substrate 200 may be a configuration included in a display panel (for example, a display panel DPN of FIG. 2), and may be a substrate on which pixel circuits and lines, or portions thereof, may be provided and/or formed. For example, the display substrate 200 may be a substrate including a base layer BSL of FIG. 5 and at least a portion of a circuit layer PCL formed on the base layer BSL. In an embodiment, the display substrate 200 may further include at least one of a display layer DPL, a color filter layer CFL, and an encapsulation layer ENC of FIG. 5, or a portion thereof.

In an embodiment, the display substrate 200 may be inspected multiple (several) times by the inspection device 100 during a manufacturing process and/or after the manufacturing process may be completed. For example, whenever each of patterning processes for forming the display substrate 200 may be completed, the optical inspection (for example, a defect inspection of pixel patterns using an optical inspection method) for the display substrate 200 using the inspection device 100 may be performed. Accordingly, the display substrate 200 may be appropriately manufactured while monitoring the manufacturing process for the display substrate 200 in real time.

The lighting unit 120 (also referred to as a "lighting device") may provide light to the display substrate 200. The lighting unit 120 may radiate light to the display substrate 200 from an upper portion of the display substrate 200, but embodiments are not limited thereto. For example, the lighting unit 120 may radiate light to the display substrate 200 from a lower portion and/or a side surface of the display substrate 200.

The imaging unit 130 (also referred to as an "imaging device") may image (or capture) the display substrate 200. For example, the imaging unit 130 may capture pixel patterns provided and/or formed on the display substrate 200.

The pixel patterns may include circuit elements (for example, circuit elements configuring pixel circuits of sub-pixels included in each pixel) and/or portions thereof formed in pixel areas of the display substrate 200. The pixel patterns may further include lines and/or portions (also referred to as "line patterns") thereof formed in and/or around the pixel areas.

For convenience, in describing embodiments of the disclosure, line patterns corresponding to portions of lines disposed inside and/or around each pixel area in which each pixel may be provided and/or disposed may be regarded as configurations included in pixel patterns provided in a corresponding pixel area. However, according to an embodiment, the pixel patterns configuring the circuit elements of each pixel and the line patterns disposed around the circuit elements may be regarded as separate configurations.

Images captured by the imaging unit 130 may be provided to the image processing unit 140. In an embodiment, the imaging unit 130 may include a high-resolution charge couple device (CCD) camera, but embodiments are not limited thereto.

The image processing unit 140 (also referred to as an "image processing device") may signal-process the images provided from the imaging unit 130 and provide the signal-processed images to the defect determination unit 150. For example, the image processing unit 140 may convert the images provided from the imaging unit 130 into a digital signal. The digital signals converted by the image processing device 140 may be provided to the defect determination unit 150 as image information.

The defect determination unit 150 (also referred to as a "determination unit", an "inspection unit", or an "inspection device") may detect a defect of the display substrate 200 using the image information provided from the image processing unit 140. For example, the defect determination unit 150 may determine whether the pixel patterns of the display substrate 200 are defective, based on the image information provided from the image processing unit 140. The defect determination unit 150 may detect a position, a type, an aspect, a shape, and/or the like of the defect.

The optical inspection (for example, an auto optical inspection (AOI)) may be performed on the display substrate 200 using the above-described inspection device 100. A method of inspecting the display substrate 200 using the inspection device 100 is described in detail in the following embodiments.

Figure 2:
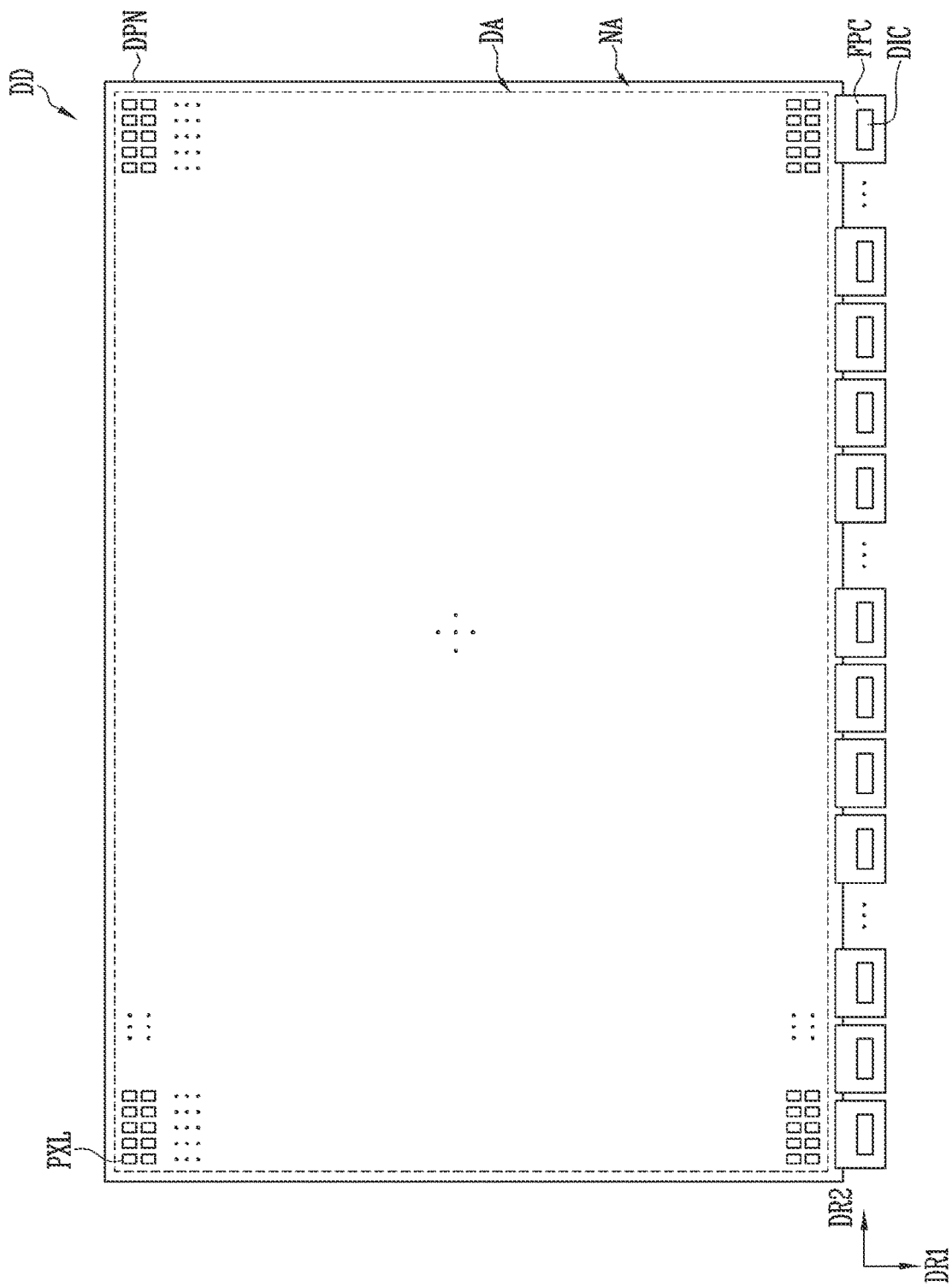
FIG. 2 is a plan view schematically illustrating a display device according to an embodiment of the disclosure.

FIG. 2 is a plan view schematically illustrating a display device DD according to an embodiment of the disclosure.

Referring to FIG. 2, the display device DD may include the display panel DPN including pixels PXL and at least one circuit board FPC connected to the display panel DPN. In an embodiment, the display device DD may include multiple circuit boards FPC.

The display panel DPN may include a display area DA in which the pixels PXL may be disposed, and a non-display area NA positioned around the display area DA. Lines and/or pads electrically connected to the pixels PXL may be disposed in the non-display area NA. In an embodiment, the non-display area NA may be an area surrounding the display area DA and may be disposed at an edge of the display panel DPN.

The pixels PXL may be arranged in the display area DA along (in) at least one direction. For example, the pixels PXL may be regularly arranged in the display area DA along a first direction DR1 and a second direction DR2. In an embodiment, the first direction DR1 may be a vertical direction (or a longitudinal direction) of the display area DA, and the second direction DR2 may be a horizontal direction (or a transverse direction) of the display area DA.

Figure 3:
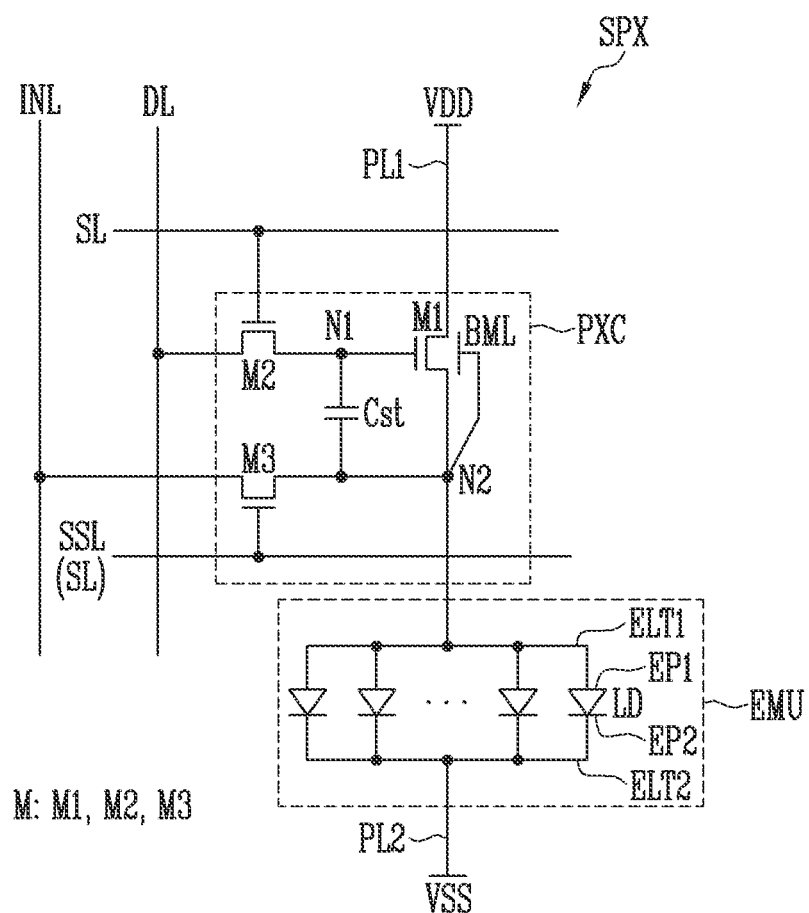
FIG. 3 is a circuit diagram schematically illustrating a sub-pixel according to an embodiment of the disclosure.
Figure 4:
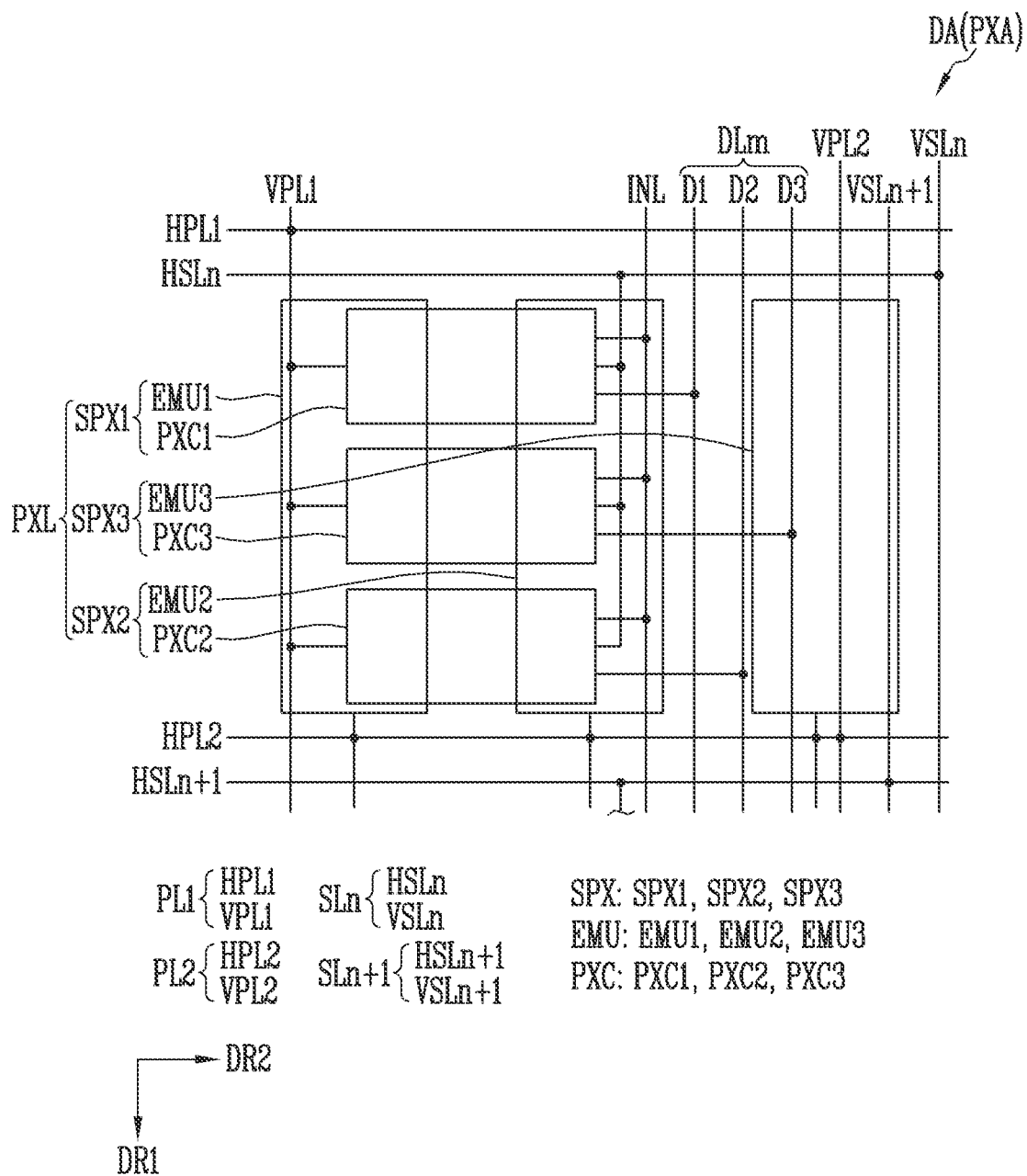
FIG. 4 is a plan view schematically illustrating a display area according to an embodiment of the disclosure.

Each pixel PXL may include at least one sub-pixel (for example, sub-pixels SPX of FIGS. 3 and 4). For example, each pixel PXL may include sub-pixels SPX emitting light of different colors.

The circuit boards FPC may be electrically connected to different pixels PXL. For example, the circuit boards FPC may be electrically connected to the pixels PXL arranged in different sub-areas (or blocks) of the display area DA.

Each of driving circuits DIC may be mounted on the circuit boards FPC. In other embodiments, the circuit boards FPC may be electrically connected to another circuit board on which the respective driving circuits DIC may be mounted.

The driving circuits DIC may be electrically connected to each of the pixels PXL through each of the circuit boards FPC. The driving circuits DIC may supply driving signals and/or driving power for driving each of the pixels PXL to each of the pixels PXL.

The driving circuits DIC may include a scan driver (also referred to as a "gate driver") for supplying respective scan signals and/or control lines to scan lines and/or control lines of the pixels PXL (or the sub-pixels SPX configuring the pixels PXL), and a data driver (also referred to as a "source driver") for supplying respective data signals to data lines of the pixels PXL. In an embodiment, the data driver may include a sensing circuit for sensing a characteristic of the pixels PXL. In another embodiment, the display device DD may include a separate sensing circuit separated from the data driver.

The scan driver may be mounted and/or formed on at least one circuit board FPC, or may be mounted and/or formed on a separate circuit board electrically connected to the circuit board FPC. However, embodiments are not limited thereto. For example, the scan driver or a portion thereof may be embedded in the display panel DPN.

The data driver may be mounted and/or formed on the circuit boards FPC. However, embodiments are not limited thereto. For example, the data driver or a portion thereof may be mounted and/or formed on a separate circuit board electrically connected to the circuit boards FPC, or may be embedded or mounted on the display panel DPN.

The display device DD may further include an additional driving element. For example, the display device DD may further include a timing controller electrically connected to the scan driver and the data driver, and a power voltage generator electrically connected to the pixels PXL, the scan driver, and the data driver. In an embodiment, the timing controller and the power voltage generator may be mounted and/or formed on a separate circuit board electrically connected to the circuit boards FPC, but embodiments are not limited thereto.

In an embodiment, the driving circuits DIC and the circuit boards FPC including the same may be disposed and/or connected to only an edge area of the display panel DPN to be adjacent to any side of the display area DA. For example, the circuit boards FPC may be disposed on only an area of the non-display area NA corresponding to a lower edge area (or an upper edge area) of the display panel DPN, and the display device DD may be a single side driving display device supplying scan signals through pads disposed in the lower edge area (or the upper edge area) of the display panel DPN and at least one driving circuit DIC electrically connected to the pads. In a case of the single side driving display device, the circuit boards FPC (or pads for connection to the circuit boards FPC) may not be disposed on remaining areas (for example, an upper area, a left area, and a right area of the display area DA) which may be in contact with other sides of the display area DA among the non-display area NA of the display panel DPN. Accordingly, in the remaining areas of the non-display area NA, a width and/or an area of the non-display area NA may be reduced or minimized.

FIG. 3 is a circuit diagram schematically illustrating a sub-pixel SPX according to an embodiment of the disclosure. For example, FIG. 3 illustrates a sub-pixel SPX that may be included in the pixel PXL of FIG. 2. In an embodiment, the sub-pixels SPX included in each pixel PXL may have circuit configurations that may be substantially identical to or similar to each other. The pixels PXL disposed in the display area DA may be substantially identical to or similar to each other.

Referring to FIG. 3, the sub-pixel SPX may be connected to a scan line SL, a data line DL (or a sub-data line), a first power line PL1, and a second power line PL2. In an embodiment, the sub-pixel SPX may be further connected to at least another power line and/or signal line. For example, the sub-pixel SPX may be further connected to an initialization power line INL (or sensing line) and/or a control line SSL.

The sub-pixel SPX may include a light emitting unit EMU for generating light of a luminance corresponding to each data signal. The sub-pixel SPX may further include a pixel circuit PXC for driving the light emitting unit EMU.

The pixel circuit PXC may be connected to the scan line SL and the data line DL, and may be connected between the first power line PL1 and the light emitting unit EMU. For example, the pixel circuit PXC may be connected to the scan line SL to which a first scan signal may be supplied, the data line DL to which the data signal may be supplied, the first power line PL1 to which a voltage of first power VDD may be supplied, and a first electrode ELT1 of the light emitting unit EMU.

In an embodiment, the pixel circuit PXC may be further connected to the control line SSL to which a second scan signal may be supplied, and the initialization power line INL connected to initialization power (or reference power) or a sensing circuit in response to a display period or a sensing period. In an embodiment, the second scan signal may be a signal identical to or different from the first scan signal. In case that the second scan signal is the signal identical to the first scan signal, the control line SSL may be integrated with the scan line SL.

The pixel circuit PXC may include at least one transistor M and a capacitor Cst. For example, the pixel circuit PXC may include a first transistor M1, a second transistor M2, a third transistor M3, and the capacitor Cst.

The first transistor M1 may be connected between the first power line PL1 and a second node N2. The second node N2 may be a node to which the pixel circuit PXC and the light emitting unit EMU may be connected to each other. For example, the second node N2 may be a node to which one electrode (for example, a source electrode) of the first transistor M1 and the first electrode ELT1 (for example, an anode electrode) of the light emitting unit EMU may be connected. A gate electrode of the first transistor M1 may be connected to a first node N1. The first transistor M1 may control a driving current supplied to the light emitting unit EMU in response to a voltage of the first node N1. For example, the first transistor M1 may be a driving transistor of the sub-pixel SPX.

In an embodiment, the first transistor M1 may further include a bottom metal layer BML (or a back gate electrode). In an embodiment, the bottom metal layer BML may be connected to the one electrode (for example, the source electrode) of the first transistor M1.

In an embodiment in which the first transistor M1 includes the bottom metal layer BML, a back-biasing technique (or a sync technique) for moving a threshold voltage of the first transistor M1 in a negative direction or a positive direction by applying a back-biasing voltage to the bottom metal layer BML of the first transistor M1 may be applied. In case that the bottom metal layer BML is disposed under a semiconductor pattern configuring a channel of the first transistor M1, an operation characteristic of the first transistor M1 may be stabilized by blocking light incident on the semiconductor pattern.

The second transistor M2 may be connected between the data line DL and the first node N1. A gate electrode of the second transistor M2 may be connected to the scan line SL. The second transistor M2 may be turned on in case that the first scan signal of a gate-on voltage (for example, a high level voltage) is supplied from the scan line SL, to connect the data line DL and the first node N1.

For each frame period, a data signal of a corresponding frame may be supplied to the data line DL, and the data signal may be transmitted to the first node N1 through the second transistor M2 during a period in which the first scan signal of the gate-on voltage may be supplied. For example, the second transistor M2 may be a switching transistor for transmitting each data signal into the sub-pixel SPX.

An electrode of the capacitor Cst may be connected to the first node N1 and another electrode of the capacitor Cst may be connected to the second node N2. The capacitor Cst may be charged with a voltage corresponding to the data signal supplied to the first node N1 during each frame period.

The third transistor M3 may be connected between the second node N2 and the initialization power line INL. A gate electrode of the third transistor M3 may be connected to the control line SSL (or the scan line SL). The third transistor M3 may be turned on in case that the second scan signal (or the first scan signal) of a gate-on voltage (for example, a high level voltage) is supplied from the control line SSL, to transmit a reference power voltage (or an initialization power voltage) supplied to the initialization power line INL to the second node N2 or transmit a voltage of the second node N2 to the initialization power line INL. The voltage of the second node N2 transmitted to the sensing circuit through the initialization power line INL may be provided to a timing controller, and may be used for compensating for a characteristic deviation of the pixels PXL (or the sub-pixels SPX), or the like.

In FIG. 3, all of the transistors M included in the pixel circuit PXC may be N-type transistors, but the disclosure is not limited thereto. For example, at least one of the first, second, and third transistors M1, M2, and M3 may be changed to a P-type transistor. A structure and a driving method of the sub-pixel SPX may be variously changed according to embodiments.

The light emitting unit EMU may include the first electrode ELT1 (also referred to as a "first pixel electrode"), a second electrode ELT2 (also referred to as a "second pixel electrode"), and at least one light emitting element LD connected between the first power VDD and the second power VSS. For example, the light emitting unit EMU may include the first electrode ELT1 connected to the first power VDD through the pixel circuit PXC and/or the first power line PL1, the second electrode ELT2 connected to the second power VSS through the second power line PL2, and at least one light emitting element LD connected between the first electrode ELT1 and the second electrode ELT2.

The first power VDD and the second power VSS may have different potentials. For example, the first power VDD may be high potential power for supplying a pixel voltage of a high level, and the second power VSS may be low potential power for supplying a pixel voltage of a low level.

In an embodiment, the light emitting unit EMU may include light emitting elements LD connected in parallel in a forward direction between the first electrode ELT1 and the second electrode ELT2. For example, first ends EP1 of the light emitting elements LD may be commonly connected to the first electrode ELT1, and second ends EP2 of the light emitting elements LD may be commonly connected to the second electrode ELT2. In another embodiment, the sub-pixel SPX may include light emitting elements LD connected only in series between the first electrode ELT1 and the second electrode ELT2 or may include only a single light emitting element LD connected in the forward direction between the first electrode ELT1 and the second electrode ELT2. In still another embodiment, the light emitting unit EMU may include light emitting elements LD connected in series and in parallel between the first electrode ELT1 and the second electrode ELT2. For example, a structure of the light emitting unit EMU may be variously changed according to embodiments.

A type, a structure, a shape, a size, and/or the number of the light emitting elements LD provided in the light emitting unit EMU may be variously changed according to embodiments. For example, each light emitting element LD may be an organic light emitting diode or an inorganic light emitting diode. Each light emitting element LD may be manufactured in various structures, shapes and/or sizes according to embodiments, and a single light emitting element LD may be provided or multiple light emitting elements LD may be provided in each light emitting unit EMU.

FIG. 4 is a plan view schematically illustrating a display area DA according to an embodiment of the disclosure. FIG. 4 schematically shows a structure of the display area DA based on a pixel area PXA in which a pixel PXL may be disposed.

The pixel area PXA may include an area in which the pixel circuits PXC and/or the light emitting units EMU of the sub-pixels SPX configuring the corresponding pixel PXL may be disposed. In an embodiment, the pixel area PXA may further include an area in which lines (or portions of the lines) positioned around the corresponding pixel PXL may be disposed. For convenience, in describing embodiments of the disclosure, in addition to elements included in each pixel PXL, each unit area in which portions of the lines positioned around the pixel PXL may be disposed may be defined as the pixel area PXA corresponding to (for example, in which the pixel PXL may be provided and/or disposed) the pixel PXL. In FIG. 4, a pixel PXL disposed on an n-th (n may be a natural number) horizontal line (for example, an n-th pixel row) and an m-th (m may be a natural number) vertical line (for example, an m-th pixel column) of the display area DA and portions of the lines disposed around the pixel PXL are shown.

Referring to FIGS. 2 to 4, the display area DA may include the pixels PXL, lines (for example, the scan lines SL, the data lines DL, initialization power lines INL, the first power line PL1, and the second power line PL2) connected to the pixels PXL. In an embodiment, the control line SSL of each horizontal line may be integrated with the scan line SL of the corresponding horizontal line.

The scan lines SL may be formed for each horizontal line. Each scan line SL may be connected to the pixel circuits PXC of the sub-pixels SPX disposed on the corresponding horizontal line.

In an embodiment, each scan line SL may include sub-scan lines each extending in the first direction DR1 and the second direction DR2 in the display area DA. For example, an n-th scan line SLn may include a horizontal scan line HSLn (for example, an n-th horizontal scan line HSLn) disposed on the n-th horizontal line of the display area DA and extending along the second direction DR2, and a vertical scan line VSLn (for example, an n-th vertical scan line VSLn) extending along the first direction DR1 in the display area DA to intersect the horizontal scan line HSLn and connected to the horizontal scan line HSLn. Similarly, an (n+1)-th scan line SLn+1 may include a horizontal scan line HSLn+1 (for example, an (n+1)-th horizontal scan line HSLn+1) disposed on an (n+1)-th horizontal line of the display area DA and extending along the second direction DR2, and a vertical scan line VSLn+1 (for example, an (n+1)-th vertical scan line VSLn+1) extending along the first direction DR1 in the display area DA to intersect the horizontal scan line HSLn+1 and connected to the horizontal scan line HSLn+1.

As described above, in case that the scan lines SL are formed in the first direction DR1 and the second direction DR2, positions of the pads PAD and/or the driving circuit (for example, the scan driver) may be freely changed. For example, even though the display device DD may be a single side driving display device, each scan signal may be supplied to the pixels PXL in a horizontal line unit.

The data lines DL may extend along the first direction DR1 in the display area DA, and may be formed for each vertical line. However, the disclosure is not limited thereto. For example, the data lines DL may be formed for two adjacent vertical lines, and the two vertical lines may share the data lines DL. A time period during which the data signal may be input to the pixels PXL may be divided, by separating the scan lines SL connected to the pixels PXL of the two vertical lines.

Each data line DL may be connected to the pixel circuits PXC of the sub-pixels SPX disposed on the corresponding vertical line. Each data line DL may include sub-data lines individually connected to the sub-pixels SPX configuring each pixel PXL. For example, an m-th data line DLm may include a first sub-data line D1 connected to first sub-pixels SPX1 of the pixels PXL disposed on the m-th vertical line, a second sub-data line D2 connected to second sub-pixels SPX2 of the pixels PXL disposed on the m-th vertical line, and a third sub-data line D3 connected to third sub-pixels SPX3 of the pixels PXL disposed on the m-th vertical line. Accordingly, the data signal may be individually supplied to each sub-pixel SPX.

The initialization power line INL may extend along the first direction DR1 in the display area DA, and may be formed for at least one vertical line. In an embodiment, the initialization power line INL may be formed for each vertical line and may be commonly connected to the sub-pixels SPX configuring each pixel PXL. Characteristics of each pixel PXL may be individually detected. In another embodiment, the initialization power lines INL may be formed to be shared by vertical lines. Characteristics of the pixels PXL may be detected in a block unit including pixels PXL.

The first power line PL1 and the second power line PL2 may be commonly connected to the pixels PXL of the display area DA. For example, the first power line PL1 may be commonly connected to the pixel circuits PXC of the sub-pixels SPX, and the second power line PL2 may be commonly connected to the light emitting units EMU of the sub-pixels SPX.

In an embodiment, each of the first power line PL1 and the second power line PL2 may be formed in a mesh shape to prevent or minimize a voltage drop (IR drop) of the first power VDD and the second power VSS. Accordingly, the voltage of the first power VDD and the voltage of the second power VSS of a uniform level may be transmitted to the pixels PXL.

For example, the first power line PL1 may include at least one first vertical power line VPL1 extending in the first direction DR1 in the display area DA, and at least one first horizontal power line HPL1 extending in the second direction DR2 in the display area DA and connected to the first vertical power line VPL1. The at least one first vertical power line VPL1 and the at least one first horizontal power line HPL1 may cross each other, and may be connected to each other at all crossing points or some crossing points.

Similarly, the second power line PL2 may include at least one second vertical power line VPL2 extending in the first direction DR1 in the display area DA, and at least one second horizontal power line HPL2 extending in the second direction DR2 in the display area and connected to the second vertical power line VPL2. The at least one second vertical power line VPL2 and the at least one second horizontal power line HPL2 may cross each other, and may be connected to each other at all crossing points or some crossing points.

In an embodiment, the first vertical power line VPL1 and the second vertical power line VPL2 may be formed for each at least one vertical line. For example, the first vertical power line VPL1 and the second vertical power line VPL2 may be formed for each vertical line, and may be spaced apart from each other with the pixels circuits PXC, which may be arranged in the pixel column of the corresponding vertical line, interposed therebetween. The number, a position, and/or the like of the first vertical power line VPL1 and the second vertical power line VPL2 may be variously changed according to embodiments.

In an embodiment, the first horizontal power line HPL1 and the second horizontal power line HPL2 may be formed for one horizontal line or at least two horizontal lines. For example, the first horizontal power line HPL1 and the second horizontal power line HPL2 may be arranged alternately to each other in the display area DA along the first direction DR1 with the pixels PXL disposed on each horizontal line interposed therebetween. For example, the first horizontal power lines HPL1 may be formed for each of odd-numbered horizontal lines and may be positioned in an upper area of pixel rows positioned on the odd-numbered horizontal line, and the second horizontal power lines HPL2 may be formed on for each of even-numbered horizontal lines and may be formed in an upper area of pixel rows positioned on the even-numbered horizontal line. A pair of adjacent first horizontal power line HPL1 and second horizontal power line HPL2 may be spaced apart from each other with the pixel circuits PXC arranged in the pixel row of each horizontal line interposed therebetween.

For example, any one first horizontal power line HPL1 may be disposed in the upper area (for example, around the horizontal scan line HSLn of the n-th scan line SLn) of the pixel PXL positioned on the n-th horizontal line, and any one second horizontal power line HPL2 may be disposed in the lower area (for example, around the horizontal scan line HSLn+1 of the (n+1)-th scan line SLn+1) of the pixel PXL. The number, positions, and/or the like of the first horizontal power line HPL1 and the second horizontal power line HPL2 may be variously changed according to embodiments.

Each pixel PXL may include sub-pixels SPX. For example, each pixel PXL may include the first sub-pixel SPX1, the second sub-pixel SPX2, and the third sub-pixel SPX3.

Each sub-pixel SPX may include each pixel circuit PXC and the light emitting unit EMU. For example, the first sub-pixel SPX1 may include a first pixel circuit PXC1 and a first light emitting unit EMU1, the second sub-pixel SPX2 may include a second pixel circuit PXC2 and a second light emitting unit EMU2, and the third sub-pixel SPX3 may include a third pixel circuit PXC3 and a third light emitting unit EMU3.

The pixel circuits PXC and the light emitting units EMU of each pixel PXL may be disposed on different layers and may overlap each other. For example, the pixel circuits PXC may be disposed in a circuit layer (for example, the circuit layer PCL of FIG. 5) (also referred to as a "pixel circuit layer" or a "back-plane layer") of the pixel area PXA in which each pixel PXL may be disposed. The light emitting units EMU may be disposed in a display layer (for example, the display layer DPL of FIG. 5) of each pixel area PXA to overlap the pixel circuits PXC of the corresponding pixel PXL, and/or at least one line (for example, at least one scan line SL, the initialization power line INL, the data line DL (or the sub-data line), the first power line PL1, and/or the second power line PL2).

The first, second, and third pixel circuits PXC1, PXC2, and PXC3 may be arranged along the first direction DR1 in each pixel area PXA. For example, the first, second, and third pixel circuits PXC1, PXC2, and PXC3 of the pixel PXL may be arranged along the first direction DR1 in an order in the pixel area PXA in which the pixel PXL may be provided.

In an embodiment, the third pixel circuit PXC3 may be positioned at a center of each pixel area PXA in the first direction DR1, and the first and second pixel circuits PXC1 and PXC2 may be disposed on both sides of the third pixel circuit PXC3 in the first direction DR1. However, positions and/or an arrangement order of the first, second, and third pixel circuits PXC1, PXC2, and PXC3 may be changed according to embodiments.

The first, second, and third pixel circuits PXC1, PXC2, and PXC3 may be commonly connected to the first power line PL1 and the scan line SL of the corresponding horizontal line and may be connected to different sub-data lines of the corresponding vertical line. For example, the first pixel circuit PXC1 may be connected to the first sub-data line D1, the second pixel circuit PXC2 may be connected to the second sub-data line D2. The third pixel circuit PXC3 may be connected to the third sub-data line D3.

In an embodiment, the first, second, and third pixel circuits PXC1, PXC2, and PXC3 may be further connected to the initialization power line INL. For example, the first, second, and third pixel circuits PXC1, PXC2, and PXC3 may be commonly connected to the initialization power line INL of the corresponding vertical line.

The first, second, and third light emitting units EMU1, EMU2, and EMU3 may be connected between each pixel circuit PXC and the second power line PL2. For example, the first, second, and third light emitting units EMU1, EMU2, and EMU3 may be connected to the first, second, and third pixel circuits PXC1, PXC2, and PXC3 through each first contact hole (for example, a first contact hole CH1 of FIGS. 5 and 6), respectively. The first, second, and third light emitting units EMU1, EMU2, and EMU3 may be connected to the adjacent second horizontal power line HPL2 through each second contact hole (for example, a second contact hole CH2 of FIGS. 5 and 6).

The first, second, and third light emitting units EMU1, EMU2, and EMU3 may be arranged along the second direction DR2 in each pixel area PXA. For example, the first, second, and third light emitting units EMU1, EMU2, and EMU3 may be sequentially arranged along the second direction DR2 in the pixel area PXA in which the corresponding pixel PXL may be provided.

The first, second, and third light emitting units EMU1, EMU2, and EMU3 may or may not overlap at least one signal line (for example, each scan line SL, data line DL, and/or initialization power line INL) and/or at least one power line (for example, the first power line PL1 and/or the second power line PL2). For example, the third light emitting unit EMU3 may overlap the third sub-data line D3, the second vertical power line VPL2, and/or at least one vertical scan line (for example, the (n+1)-th scan line VSLn+1) of a corresponding vertical line.

In the embodiment of FIG. 4, the pixel circuits PXC and the light emitting units EMU of the sub-pixels SPX may be arranged along different directions in the pixel area PXA in which each pixel PXL may be provided, but the disclosure is not limited thereto. For example, positions, an arrangement direction, and/or the like of the pixel circuits PXC and the light emitting units EMU may be variously changed according to embodiments.

Figure 5:
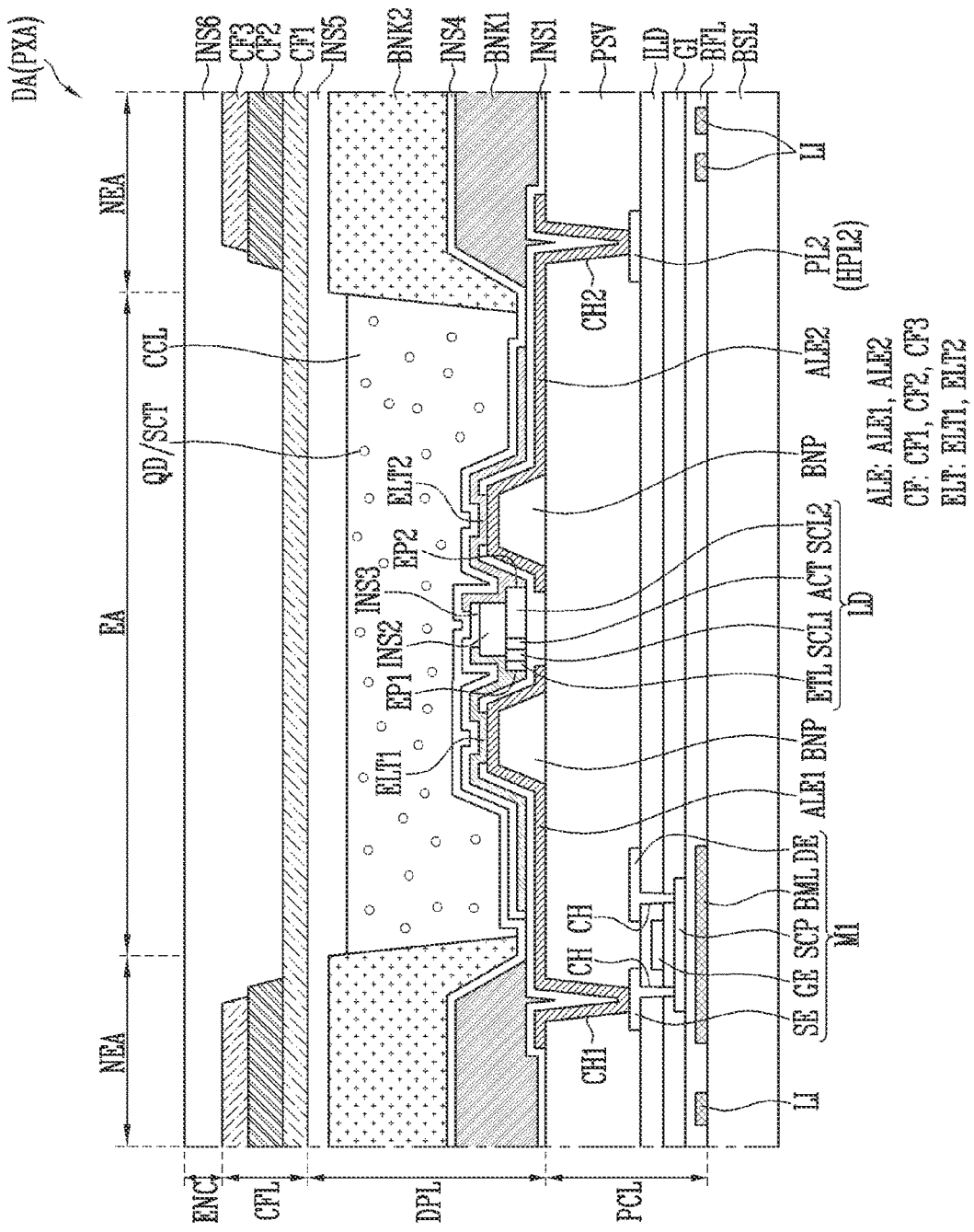
FIG. 5 is a cross-sectional view schematically illustrating a display area according to an embodiment of the disclosure.

FIG. 5 is a cross-sectional view schematically illustrating a display area DA according to an embodiment of the disclosure. For example, FIG. 5 schematically illustrates a cross-section of a pixel area PXA based on one sub-pixel SPX.

Referring to FIGS. 2 to 5, the display panel DPN including the display area DA may include a base layer BSL, the circuit layer PCL, and the display layer DPL. The circuit layer PCL and the display layer DPL may be provided to overlap each other on the base layer BSL. For example, the circuit layer PCL and the display layer DPL may be sequentially disposed on a surface of the base layer BSL.

The display device DD may further include the color filter layer CFL and/or the encapsulation layer ENC (or a protective layer) disposed on the display layer DPL. In an embodiment, the color filter layer CFL and/or the encapsulation layer ENC may be directly formed on a surface of the base layer BSL on which the circuit layer PCL and the display layer DPL may be formed, but embodiments are not limited thereto.

The base layer BSL may be a substrate or a film of a rigid or flexible material. In an embodiment, the base layer BSL may include at least one transparent or opaque insulating material, and may have a structure of a single layer or multiple layers.

The circuit layer PCL may be provided on a surface of the base layer BSL.

The circuit layer PCL may include circuit elements configuring each pixel circuit PXC. For example, in each pixel area PXA of the circuit layer PCL, circuit elements (for example, the transistors M and the capacitor Cst configuring the pixel circuits PXC of the corresponding pixel PXL) may be formed. FIG. 5 shows any one transistor, for example, the first transistor including M1 the bottom metal layer BML, provided in each pixel circuit PXC as an example of the circuit elements that may be disposed in the circuit layer PCL.

The circuit layer PCL may further include the lines connected to the pixels PXL. For example, the circuit layer PCL may include the scan lines SL, the control lines SSL, the data lines DL, the initialization power lines INL, and/or the first and second power lines PL1 and PL2 connected to the pixels PXL. FIG. 5 shows lines LI positioned in the same layer (for example, a first conductive layer) as the bottom metal layer BML, as an example of the lines that may be disposed in the circuit layer PCL. Each line LI may be one of signal lines and power lines connected to the pixels PXL. In an embodiment, at least one line (or a portion of the line) may be disposed in another layer of the circuit layer PCL.

The circuit layer PCL may further include insulating layers. For example, the circuit layer PCL may include a buffer layer BFL, a gate insulating layer GI, an interlayer insulating layer ILD, and/or a passivation layer PSV sequentially disposed on a surface of the base layer BSL.

The circuit layer PCL may include the first conductive layer disposed on the base layer BSL and including the bottom metal layer BML of the first transistor M1. For example, the first conductive layer may be disposed between the base layer BSL and the buffer layer BFL, and may include the bottom metal layer BML of the first transistor M1 provided in each pixel circuit PXC. The bottom metal layer BML of the first transistor M1 may overlap a gate electrode GE and a semiconductor pattern SCP of the first transistor M1.

The first conductive layer may further include the lines LI. For example, the first conductive layer may include at least some lines LI (or portions of the lines LI) extending in the first direction DR1 in the display area DA. For example, the first conductive layer may include vertical scan lines (for example, the n-th and (n+1)-th vertical scan lines VSLn and VSLn+1 of FIG. 4), the first vertical power lines VPL1, the initialization power lines INL, the data lines DL, and the second vertical power lines VPL2.

The buffer layer BFL may be disposed on a surface of the base layer BSL including the first conductive layer. The buffer layer BFL may prevent an impurity from diffusing into each circuit element.

A semiconductor layer may be disposed on the buffer layer BFL. The semiconductor layer may include the semiconductor pattern SCP of each transistor M. The semiconductor pattern SCP may include a channel area overlapping the gate electrode GE of the corresponding transistor M, and first and second conductive areas (for example, source and drain areas) disposed on both sides of the channel area.

The gate insulating layer GI may be disposed on the semiconductor layer. A second conductive layer may be disposed on the gate insulating layer GI.

The second conductive layer may include the gate electrode GE of each transistor M. The second conductive layer may further include the electrode of the capacitor Cst, a bridge pattern, and/or the like provided in the pixel circuit PXC. In case that at least one line disposed in the display area DA is configured of multiple layers, the second conductive layer may further include a conductive pattern configuring the at least one line.

The interlayer insulating layer ILD may be disposed on the second conductive layer. A third conductive layer may be disposed on the interlayer insulating layer ILD.

The third conductive layer may include a source electrode SE and a drain electrode DE of each transistor M. The source electrode SE and the drain electrode DE may be connected to different areas (for example, the source area and the drain area, respectively) of the semiconductor pattern SCP included in the corresponding transistor M through respective contact holes CH.

The third conductive layer may further include another electrode of the capacitor Cst, lines, a bridge pattern, and/or the like provided in the pixel circuit PXC. For example, the third conductive layer may include horizontal scan lines (for example, the n-th and (n+1)-th horizontal scan lines HSLn and HSLn+1 of FIG. 4), the first horizontal power lines HPL1, and the second horizontal power lines HPL2. In case that at least one line disposed in the display area DA is configured of multiple layers, the third conductive layer may further include a conductive pattern configuring the at least one line.

Each conductive pattern, electrode, and/or line configuring the first to third conductive layers may have conductivity by including a conductive material, and a configuration material thereof is not particularly limited. For example, each conductive pattern, electrode, and/or line configuring the first to third conductive layers may include at least one metal selected from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), titanium (Ti), tantalum (Ta), tungsten (W), and copper (Cu), or other conductive materials.

The passivation layer PSV may be disposed on the third conductive layer. Each of the buffer layer BFL, the gate insulating layer GI, the interlayer insulating layer ILD, and the passivation layer PSV may be a single layer or multiple layers, and may include at least one inorganic insulating material and/or organic insulating material. In an embodiment, each of the buffer layer BFL, the gate insulating layer GI, and the interlayer insulating layer ILD may include various types of inorganic insulating materials including silicon nitride ($SiN_x$), silicon oxide ($SiO_x$), silicon oxynitride ($SiO_xN_y$), or the like. In an embodiment, the passivation layer PSV may include an organic insulating layer of at least one layer including at least one organic insulating material. In an embodiment, the passivation layer PSV may be at least entirely disposed in the display area DA and may planarize a surface of the circuit layer PCL. In an embodiment, the passivation layer PSV may be multiple layers including an inorganic insulating layer and an organic insulating layer, but embodiments are not limited thereto.

The display layer DPL may be disposed on the passivation layer PSV.

The display layer DPL may include the light emitting unit EMU of each pixel PXL. For example, the display layer DPL may include alignment electrodes ALE, at least one light emitting element LD, and pixel electrodes ELT disposed in an emission area EA of each pixel PXL. In an embodiment, each light emitting unit EMU may include at least two light emitting elements LD.

The display layer DPL may further include insulating patterns and/or insulating layers sequentially disposed on a surface of the base layer BSL on which the circuit layer PCL may be formed. For example, the display layer DPL may include bank patterns BNP, a first insulating layer INS1, a first bank BNK1, a second insulating layer INS2, a third insulating layer INS3, a fourth insulating layer INS4, a second bank BNK2, and/or a fifth insulating layer INS5. In an embodiment, the display layer DPL may further include a light conversion layer CCL.

The bank patterns BNP (also referred to as "patterns" or "wall patterns") may be disposed on the passivation layer PSV. The bank patterns BNP may be disposed under the alignment electrodes ALE to overlap a portion of each of the alignment electrodes ALE.

The alignment electrodes ALE may protrude in an upper direction of the pixel PXL around the light emitting elements LD by the bank patterns BNP. The bank patterns BNP and the alignment electrodes ALE thereon may form a reflective protrusion pattern around the light emitting element(s) LD. Accordingly, light efficiency of the pixel PXL may be improved.

The bank patterns BNP may be insulating patterns of a single layer or multiple layers including an inorganic insulating material and/or an organic insulating material. The alignment electrodes ALE may be disposed on the bank patterns BNP.

The alignment electrodes ALE may include a first alignment electrode ALE1 and a second alignment electrode ALE2. The first alignment electrode ALE1 and the second alignment electrode ALE2 may be disposed adjacent to each other and may be separated from each other. The first alignment electrode ALE1 may be disposed around the first end(s) EP1 of the light emitting element(s) LD, and the second alignment electrode ALE2 may be disposed around the second end(s) EP2 of the light emitting element(s) LD.

Each alignment electrode ALE may include a conductive material. For example, each alignment electrode ALE may include at least one metal among various metal materials including silver (Ag), magnesium (Mg), aluminum (Al), platinum (Pt), palladium (Pd), gold (Au), nickel (Ni), neodymium (Nd), iridium (Ir), chromium (Cr), titanium (Ti), molybdenum (Mo), and copper (Cu), or an alloy thereof, a conductive oxide such as indium tin oxide (ITO), indium zinc oxide (IZO), indium tin zinc oxide (ITZO), zinc oxide (ZnO), aluminum doped zinc oxide (AZO), gallium doped zinc oxide (GZO), zinc tin oxide (ZTO), gallium tin oxide (GTO), and fluorine doped tin oxide (FTO), and a conductive polymer such as PEDOT, but is not limited thereto. For example, the alignment electrodes ALE may include another conductive material such as a carbon nano tube or graphene. For example, the alignment electrodes ALE may have conductivity by including at least one of various conductive materials. The alignment electrodes ALE may include the same or different conductive materials.

Each alignment electrode ALE may be a single layer or multiple layers. For example, each alignment electrode ALE may include a reflective electrode layer including a reflective conductive material (for example, metal), and may be configured as an electrode of a single layer or multiple layers.

The first insulating layer INS1 may be disposed on the alignment electrodes ALE. In an embodiment, the first insulating layer INS1 may include openings (or contact holes) opened to connect each of the alignment electrodes ALE to each of the pixel electrodes ELT.

The first insulating layer INS1 may be a single layer or multiple layers, and may include an inorganic insulating material and/or an organic insulating material. In an embodiment, the first insulating layer INS1 may include at least one type of inorganic insulating material including silicon nitride ($SiN_x$), silicon oxide ($SiO_x$), or silicon oxynitride ($SiO_xN_y$).

As the alignment electrodes ALE may be covered by the first insulating layer INS1, the alignment electrodes ALE may be prevented from being damaged in a subsequent process. A short defect may be prevented from occurring due to improper connection between the alignment electrodes ALE and the light emitting element(s) LD.

The first bank BNK1 may be disposed in the display area DA in which the alignment electrodes ALE and the first insulating layer INS1 may be formed. The first bank BNK1 may be formed in a non-emission area NEA to surround the emission area EA of each pixel PXL. The first bank BNK1 may include a light blocking material including a black matrix material or the like, and/or a reflective material.

At least one light emitting element LD may be provided in each emission area EA (for example, the emission area of each sub-pixel SPX) surrounded by the first bank BNK1. For example, light emitting elements LD may be provided in each emission area EA. Each of the light emitting elements LD may emit any one light of light of a specific color and/or white light. In an embodiment, the light emitting elements LD may be provided in a form in which the light emitting elements LD may be sprayed into a solution and provided to each sub-pixel SPX (or each pixel PXL). The light emitting elements LD may be aligned between the alignment electrodes ALE by alignment signals applied to the alignment electrodes ALE (or alignment lines before being separated into the alignment electrodes ALE of each pixel PXL). For example, in case that each sub-pixel SPX includes the first alignment electrode ALE1 and the second alignment electrode ALE2 adjacent to each other, the light emitting elements LD may be aligned between the first alignment electrode ALE1 and the second alignment electrode ALE2.

In an embodiment, each light emitting element LD may be an ultra-small inorganic light emitting diode as small as a micro scale or a nano scale formed in a structure in which a nitride-based or phosphide-based semiconductor may be grown. In an embodiment, each light emitting element LD may be an ultra-small inorganic light emitting diode having a rod shape and having a size ranging from several nanometers to several hundreds of micrometers, but is not limited thereto.

Each light emitting element LD may include a light emitting stack including a first semiconductor layer SCL1 (for example, a P-type semiconductor layer), an active layer ACT, and a second semiconductor layer SCL2 (for example, an N-type semiconductor layer) sequentially disposed in a direction (for example, a direction from the first end EP1 to the second end EP2). Each light emitting element LD may further include an insulating film surrounding an outer circumferential surface (for example, a side surface of a cylinder) of the light emitting stack.

In an embodiment, each light emitting element LD may further include at least one electrode layer ETL positioned at the first end EP1 and/or the second end EP2. For example, each light emitting element LD may further include the electrode layer ETL disposed at the first end EP1.

The first semiconductor layer SCL1 may include a semiconductor layer of a first conductivity type. For example, the first semiconductor layer SCL1 may include at least one P-type semiconductor layer. For example, the first semiconductor layer SCL1 may include the P-type semiconductor layer including a nitride-based or phosphide-based semiconductor material and doped with a dopant (or a P-type dopant) of the first conductivity type such as Mg.

The active layer ACT may be formed in a single-quantum well or multi-quantum well structure. According to an embodiment, a nitride-based or phosphide-based semiconductor material may be used to form the active layer ACT, and various other materials may form the active layer ACT. A position of the active layer ACT may be changed according to a type, a shape, and/or the like of the light emitting element LD. In an embodiment, the active layer ACT may emit light having a wavelength of 400 nm to 900 nm, and may use a double hetero-structure.

The second semiconductor layer SCL2 may include a semiconductor layer of a type different from that of the first semiconductor layer SCL1. For example, the second semiconductor layer SCL2 may include at least one N-type semiconductor layer. For example, the second semiconductor layer SCL2 may be an N-type semiconductor layer including a nitride-based or phosphide-based semiconductor material and doped with a dopant (or an N-type dopant) of a second conductivity type such as Si, Ge, or Sn.

The electrode layer ETL may include a transparent conductive material and may be substantially transparent. Accordingly, light generated by the light emitting element LD may pass through the electrode layer ETL.

The second insulating layer INS2 may be disposed on a portion of the light emitting elements LD. In an embodiment, the second insulating layer INS2 may be locally disposed on a portion including a central portion of the light emitting elements LD to expose the first and second ends EP1 and EP2 of the light emitting elements LD aligned in the emission area EA of the corresponding sub-pixel SPX. In another embodiment, the second insulating layer INS2 may be entirely formed in the display area DA including pixel areas PXA, and may include contact holes exposing the first ends EP1 and the second ends EP2 of the light emitting elements LD. In case that the second insulating layer INS2 is formed on the light emitting elements LD, the light emitting elements LD may be stably fixed.

The second insulating layer INS2 may be a single layer or multiple layers, and may include at least one inorganic insulating material and/or organic insulating material. For example, the second insulating layer INS2 may include various types of organic and/or inorganic insulating materials including silicon nitride ($SiN_x$), silicon oxide ($SiO_x$), silicon oxynitride ($SiO_xN_y$), aluminum oxide ($Al_xO_y$), a photoresist material, and the like.

On the ends of the light emitting elements LD, which may not be covered by the second insulating layer INS2, for example, on the first and second ends EP1 and EP2, different pixel electrodes ELT may be disposed and/or formed. For example, a first electrode ELT1 (also referred to as a "first pixel electrode") may be disposed on the first ends EP1 of the light emitting elements LD, and a portion of a second electrode ELT2 (also referred to as a "second pixel electrode") may be disposed on the second ends EP2 of the light emitting elements LD.

In an embodiment, the first electrode ELT1 may be electrically connected to the first alignment electrode ALE1 through at least one contact portion. Similarly, the second electrode ELT2 may be electrically connected to the second alignment electrode ALE2 through at least one contact portion.

In an embodiment, the first alignment electrode ALE1 of each sub-pixel SPX may be electrically connected to at least one circuit element (for example, the first transistor M1) included in the pixel circuit PXC of the corresponding sub-pixel SPX through at least one contact portion (for example, the first contact hole CH1). Similarly, the second alignment electrode ALE2 may be electrically connected to the second power line PL2 (for example, the second horizontal power line HPL2 disposed around the corresponding sub-pixel SPX) through at least one contact portion (for example, the second contact hole CH2).

The first electrode ELT1 may be disposed on the first alignment electrode ALE1 to overlap a portion of the first alignment electrode ALE1, and the second electrode ELT2 may be disposed on the second alignment electrode ALE2 to overlap a portion of the second alignment electrode ALE2.

In an embodiment, the first electrode ELT1 may be electrically connected to the first ends EP1 of the light emitting elements LD. The second electrode ELT2 may be electrically connected to the second ends EP2 of the light emitting elements LD.

The first electrode ELT1 and the second electrode ELT2 may be formed in the same or different layers. In an embodiment, the first electrode ELT1 and the second electrode ELT2 may be disposed in different layers with the third insulating layer INS3 interposed therebetween. In another embodiment, the first electrode ELT1 and the second electrode ELT2 may be formed in the same layer, and the pixel PXL may not include the third insulating layer INS3. A mutual position, a formation order, and/or the like of the pixel electrodes ELT may be changed according to embodiments.

In case that each sub-pixel SPX includes the light emitting unit EMU of a series structure or a series-parallel structure including at least two series stages, the sub-pixel SPX may further include at least another alignment electrode ALE and/or at least another pixel electrode ELT.

The pixel electrodes ELT may include at least one conductive material. In an embodiment, the pixel electrodes ELT may include a transparent conductive material and may be substantially transparent. Accordingly, the light generated by the light emitting elements LD may pass through the pixel electrodes ELT.

The fourth insulating layer INS4 may be disposed in the display area DA in which the pixel electrodes ELT may be formed.

The fourth insulating layer INS4 may be a single layer or multiple layers, and may include an inorganic insulating material and/or an organic insulating material. The fourth insulating layer INS4 may be formed on each light emitting unit EMU and may protect the light emitting unit EMU.

In an embodiment, the display panel DPN may include the light conversion layer CCL disposed on the light emitting unit EMU of each sub-pixel SPX. For example, the light conversion layer CCL may be provided in each emission area EA to be positioned on each light emitting unit EMU.

The display panel DPN may further include the second bank BNK2 disposed in the non-emission area NEA to overlap the first bank BNK1. The second bank BNK2 may define (or partition) each emission area in which the light conversion layer CCL may be formed. In an embodiment, the second bank BNK2 may be integrated with the first bank BNK1.

The second bank BNK2 may include a light blocking material including a black matrix material or the like, and/or a reflective material. The second bank BNK2 may include a material identical to or different from that of the first bank BNK1.

The light conversion layer CCL may include at least one of wavelength conversion particles (or color conversion particles) for converting a wavelength and/or a color of the light emitted from the light emitting elements LD, and light scattering particles for increasing light output efficiency of the pixel PXL by scattering the light emitted from the light emitting elements LD. For example, each light conversion layer CCL may be disposed on each light emitting unit EMU. Each light conversion layer CCL may include wavelength conversion particles, and/or light scattering particles SCT such as at least one type of quantum dot QD (for example, a red quantum dot, a green quantum dot, and/or a blue quantum dot).

For example, in case that any one sub-pixel SPX is set as a red (or green) sub-pixel, and blue light emitting elements LD are provided in the light emitting unit EMU of the sub-pixel SPX, the light conversion layer CCL including a red (or green) quantum dot QD for converting blue light into red (or green) light may be provided on the light emitting unit EMU of the sub-pixel SPX. In an embodiment, the light conversion layer CCL may further include the light scattering particles SCT.

In case that another sub-pixel SPX is set as a blue sub-pixel and blue light emitting elements LD are provided in the light emitting unit EMU of the sub-pixel SPX, the light conversion layer CCL including the light scattering particles SCT may be provided on the light emitting unit EMU of the sub-pixel SPX.

The fifth insulating layer INS5 may be formed on a surface of the base layer BSL including the light emitting units EMU and/or the light conversion layers CCL of the sub-pixels SPX. The fifth insulating layer INS5 may be a single layer or multiple layers, and may include an organic insulating material and/or an inorganic insulating material.

In an embodiment, the fifth insulating layer INS5 may include an organic insulating layer of at least one layer. The fifth insulating layer INS5 may be entirely disposed in at least the display area DA, and may substantially planarize a surface of the display layer DPL. The fifth insulating layer INS5 may protect the light emitting units EMU and/or the light conversion layers CCL of the sub-pixels SPX.

The color filter layer CFL may be disposed on the fifth insulating layer INS5.

The color filter layer CFL may include color filters CF corresponding to colors of the sub-pixels SPX. For example, the color filter layer CFL may include a first color filter CF1 disposed in the emission area EA of the first sub-pixel SPX1, a second color filter CF2 disposed in the emission area EA of the second sub-pixel SPX2, and a third color filter CF3 disposed in the emission area EA of the third sub-pixel SPX3. Each color filter CF may be provided on the fifth insulating layer INS5 to overlap the light emitting unit EMU of the corresponding sub-pixel SPX.

In an embodiment, the first, second, and third color filters CF1, CF2, and CF3 may be disposed to overlap each other in the non-emission area NEA. In another embodiment, the first, second, and third color filters CF1, CF2, and CF3 may be formed to be separated from each other on the emission areas EA of the sub-pixels SPX, and a separate light blocking pattern or the like may be disposed between the first, second, and third color filters CF1, CF2, and CF3.

The encapsulation layer ENC may be disposed on the color filter layer CFL. The encapsulation part ENC may include a sixth insulating layer INS6. The sixth insulating layer INS6 may be a single layer or multiple layers, and may include an organic insulating material and/or an inorganic insulating material. In an embodiment, the sixth insulating layer INS6 may be entirely formed in at least the display area DA to cover the circuit layer PCL, the display layer DPL, and/or the color filter layer CFL, and may planarize a surface of the panel DPN.

Figure 6:
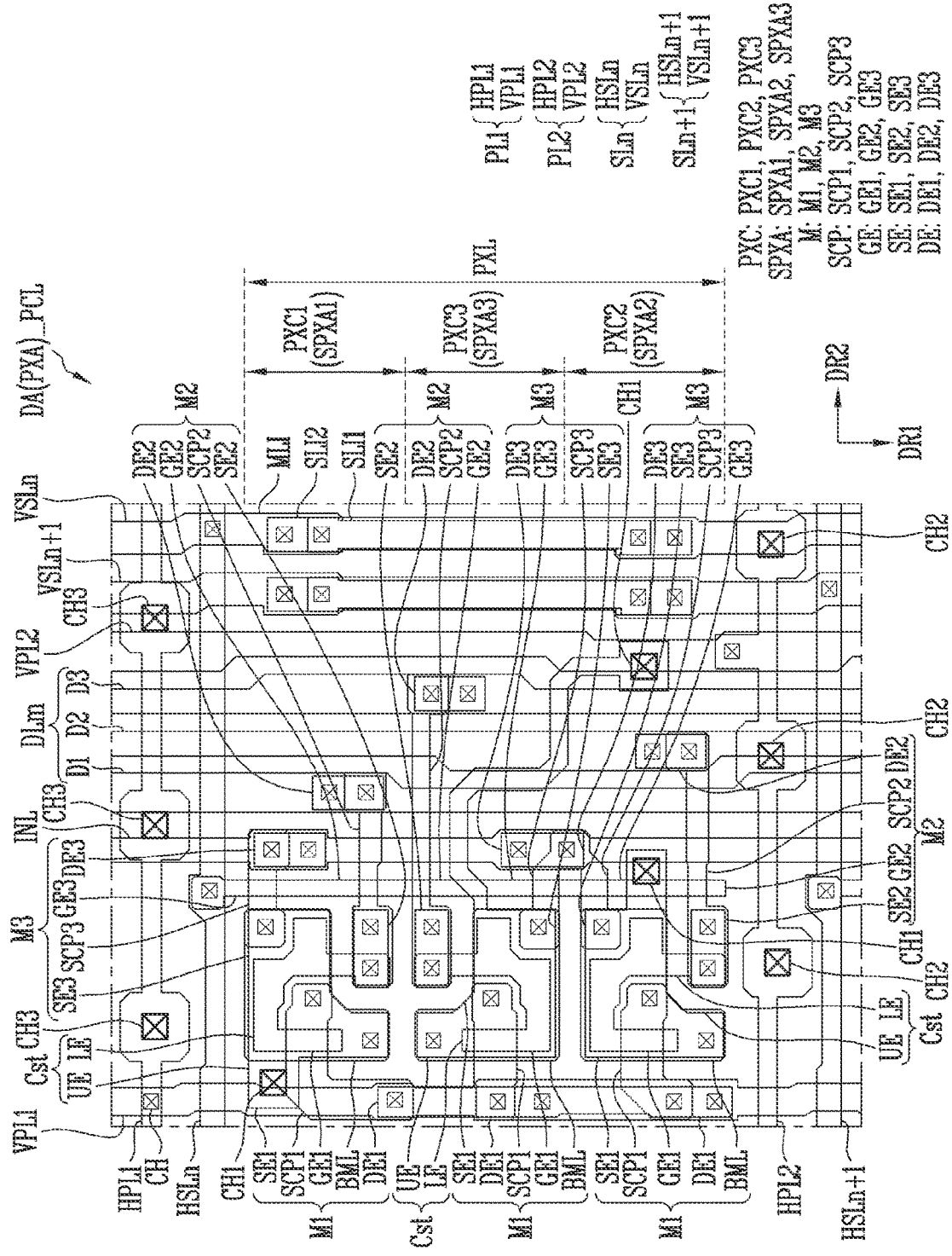
FIG. 6 is a plan view schematically illustrating a circuit layer of a display area according to an embodiment of the disclosure.

FIG. 6 is a plan view schematically illustrating a circuit layer PCL of a display area DA according to an embodiment of the disclosure. For example, FIG. 6 illustrates a structure of the circuit layer PCL, based on the pixel area PXA in which the pixel PXL of FIG. 4 may be disposed.

Referring to FIGS. 2 to 6, the circuit layer PCL may include the pixel circuits PXC disposed in each pixel area PXA. For example, the circuit layer PCL may include a first pixel circuit PXC1, a second pixel circuit PXC2, and a third pixel circuit PXC3 disposed in a first circuit area SPXA1, a second circuit area SPXA2, and a third circuit area SPXA3 of each pixel area PXA.

The circuit layer PCL may further include various lines connected to the pixels PXL. For example, the circuit layer PCL may further include the scan lines SL, the data lines DL, the initialization power lines INL, and the first and second power lines PL1 and PL2.

The circuit layer PCL may further include contact holes CH for electrically connecting circuit elements, electrodes, conductive patterns, and/or lines disposed in the circuit layer PCL to each other. For convenience, in FIG. 6, a symbol is shown to only one contact hole CH representatively to the contact holes CH for connecting specific elements in the circuit layer PCL.

In an embodiment, at least one line may include at least two sub-lines disposed in different layers on the base layer BSL. For example, a vertical scan line of each of the scan lines SL including the vertical scan lines VSLn and VSLn+1 of the n-th scan line SLn and the (n+1)-th scan line SLn+1 may be formed of a line of multiple layers including a main line MLI disposed in the same layer as the bottom metal layers BML, a first sub-line SLI1 disposed in the same layer as the gate electrodes GE, and a second sub-line SLI2 disposed in the same layer as the source and drain electrodes SE and DE. The main line MLI, the first sub-line SLI1, and the second sub-line SLI2 may be connected to each other through the contact holes CH formed in the corresponding vertical scan line. Accordingly, signal delay may be prevented and the pixels PXL may be stably driven by reducing or minimizing a resistance of the scan lines SL.

The circuit layer PCL may further include first contact holes CH1, second contact holes CH2, and third contact holes CH3 formed between the circuit layer PCL and the display layer DPL.

Each of the first contact holes CH1 may connect each pixel circuit PXC and the light emitting unit EMU corresponding thereto. For example, the first contact hole CH1 formed in each first sub-pixel SPX1 may be formed between the first pixel circuit PXC1 and the first alignment electrode ALE1 of the first light emitting unit EMU1. Similarly, the first contact hole CH1 formed in each second sub-pixel SPX2 may be formed between the second pixel circuit PXC2 and the first alignment electrode ALE1 of the second light emitting unit EMU2, and the first contact hole CH1 formed in each third sub-pixel SPX3 may be formed between the third pixel circuit PXC3 and the first alignment electrode ALE1 of the third light emitting unit EMU3.

The second contact holes CH2 may connect the second power line PL2 and the second alignment electrodes ALE2 of the light emitting units EMU. For example, the second contact holes CH2 may be formed between the second horizontal power lines HPL2, which may be repeatedly disposed for each of two or more horizontal lines, and the second alignment electrodes ALE2 of the light emitting units EMU positioned around the second horizontal power lines HPL2. Accordingly, in a manufacturing process of the pixels PXL (for example, an alignment process of the light emitting elements LD), the second alignment signal may be applied to the second alignment electrodes ALE2 through the second power line PL2.

The third contact holes CH3 may connect the first power line PL1 and floating patterns (not shown) of the display layer DPL. For example, the third contact holes CH3 may be formed between the first horizontal power lines HPL1, which may be repeatedly disposed for each of two or more horizontal lines, and the floating patterns overlapping the first horizontal power lines HPL1. The floating patterns may be first formed integrally with the first alignment electrodes ALE1 of the sub-pixels SPX to configure the first alignment line together with the first alignment electrodes ALE1. Accordingly, in the alignment process of the light emitting elements LD, the first alignment signal may be supplied to the first alignment line through the first power line PL1. After the alignment process of the light emitting elements LD may be completed, the first alignment line may be disconnected around the third contact holes CH3 to separate the floating patterns from the first alignment electrodes ALE1 of the sub-pixels SPX. Accordingly, the sub-pixels SPX may be individually driven.

Each pixel circuit PXC may include the first transistor M1, the second transistor M2, the third transistor M3, and the capacitor Cst disposed in each circuit area SPXA. For example, the first pixel circuit PXC1 may include the first transistor M1, the second transistor M2, the third transistor M3, and the capacitor Cst disposed in the first circuit area SPXA1 of the corresponding pixel area PXA. The second pixel circuit PXC2 may include the first transistor M1, the second transistor M2, the third transistor M3, and the capacitor Cst disposed in the second circuit area SPXA2 of the corresponding pixel area PXA. The third pixel circuit PXC3 may include the first transistor M1, the second transistor M2, the third transistor M3, and the capacitor Cst disposed in the third circuit area SPXA3 of the corresponding pixel area PXA.

Each first transistor M1 may include a first semiconductor pattern SCP1, a first gate electrode GE1, a first source electrode SE1, and a first drain electrode DE1. In an embodiment, each first transistor M1 may further include a bottom metal layer BML overlapping the first gate electrode GE1.

The first semiconductor pattern SCP1 may overlap the first gate electrode GE1 and the bottom metal layer BML, and may be connected to the first source electrode SE1 and the first drain electrode DE1. For example, both ends of the first semiconductor pattern SCP1 may be connected to the first source electrode SE1 and the first drain electrode DE1 through respective contact holes CH.

The first gate electrode GE1 may be connected to a lower electrode LE of the capacitor Cst and a second source electrode SE2. For example, the first gate electrode GE1 may be integral with the lower electrode LE of the capacitor Cst, and may be connected to the second source electrode SE2 through at least one contact hole CH.

The first source electrode SE1 may be connected to an upper electrode UE of the capacitor Cst and a third source electrode SE3. For example, the first source electrode SE1 may be integrated with the upper electrode UE of the capacitor Cst and the third source electrode SE3. The first source electrode SE1 may be connected to the first electrode ELT1 formed in the light emitting unit EMU of the corresponding sub-pixel SPX through each first contact hole CH1. For example, the first source electrode SE1 of the first pixel circuit PXC1, the upper electrode UE of the capacitor Cst, and the third source electrode SE3 may be connected to the first alignment electrode ALE1 of the first light emitting unit EMU1 through the first contact hole CH1 connecting the first pixel circuit PXC1 and the first light emitting unit EMU1, and may be connected to the first electrode ELT1 of the first light emitting unit EMU1 through the first alignment electrode ALE1.

The first drain electrode DE1 may be connected to the first power line PL1. For example, the first drain electrode DE1 may be connected to the first vertical power line VPL1 through at least one contact hole CH.

The bottom metal layer BML may overlap the first semiconductor pattern SCP1 and the first gate electrode GE1, and may be connected to the first source electrode SE1. For example, the bottom metal layer BML may be connected to the first source electrode SE1 through at least one contact hole CH.

Each second transistor M2 may include a second semiconductor pattern SCP2, a second gate electrode GE2, the second source electrode SE2, and a second drain electrode DE2.

The second semiconductor pattern SCP2 may overlap the second gate electrode GE2 and may be connected to the second source electrode SE2 and the second drain electrode DE2. For example, both ends of the second semiconductor pattern SCP2 may be connected to the second source electrode SE2 and the second drain electrode DE2 through respective contact holes CH.

The second gate electrode GE2 may be connected to the scan line SL. For example, the second gate electrode GE2 may be connected to each scan line SL (for example, the horizontal scan line HSLn of the n-th scan line SLn) through at least one contact hole CH.

The second source electrode SE2 may be connected to the lower electrode LE of the capacitor Cst and the first gate electrode GE1. For example, the second source electrode SE2 may be connected to the lower electrode LE of the capacitor Cst and the first gate electrode GE1 through at least one contact hole CH.

The second drain electrode DE2 may be connected to the sub-data line of the corresponding sub pixel SPX. For example, the second drain electrode DE2 of the first pixel circuit PXC1 may be connected to the first sub-data line D1 through at least one contact hole CH, the second drain electrode DE2 of the second pixel circuit PXC2 may be connected to the second sub-data line D2 through at least one contact hole CH, and the second drain electrode DE2 of the third pixel circuit PXC3 may be connected to the third sub-data line D3 through at least one contact hole CH.

Each third transistor M3 may include a third semiconductor pattern SCP3, a third gate electrode GE3, a third source electrode SE3, and a third drain electrode DE3.

The third semiconductor pattern SCP3 may overlap the third gate electrode GE3 and may be connected to the third source electrode SE3 and the third drain electrode DE3. For example, both ends of the third semiconductor pattern SCP3 may be connected to the third source electrode SE3 and the third drain electrode DE3 through respective contact holes CH.

The third gate electrode GE3 may be connected to each scan line SL or may be connected to the separate control line SSL separated from the scan line SL. In an embodiment, the third gate electrode GE3 may be integral with the second gate electrode GE2 and may be connected to each scan line SL through at least one contact hole CH.

The third source electrode SE3 may be connected to the upper electrode UE of the capacitor Cst and the first source electrode SE1. For example, the third source electrode SE3 may be integrated with the upper electrode UE of the capacitor Cst and the first source electrode SE1.

The third drain electrode DE3 may be connected to the initialization power line INL. For example, the third drain electrode DE3 may be connected to the initialization power line INL through at least one contact hole CH.

The capacitor Cst may include the lower electrode LE and the upper electrode UE.

The lower electrode LE of the capacitor Cst may be connected to the first gate electrode GE1 and the second source electrode SE2. For example, the lower electrode LE of the capacitor Cst may be integrated with the first gate electrode GE1 and the second source electrode SE2.

The upper electrode UE of the capacitor Cst may be connected to the first source electrode SE1 and the third source electrode SE3. For example, the upper electrode UE of the capacitor Cst may be integrated with the first source electrode SE1 and the third source electrode SE3.

In an embodiment, the bottom metal layers BML provided in the display area DA and at least some lines extending in the first direction DR1 may be disposed in the same layer of the circuit layer PCL. For example, the bottom metal layers BML, the vertical scan line (for example, the main lines MLI of the vertical scan lines including the vertical scan lines VSLn and VSLn+1 of the n-th scan line SLn and the (n+1)-th scan line SLn+1), the first vertical power lines VPL1, the initialization power lines INL, the data lines DL (for example, the first, second, and third sub-data lines D1, D2, and D3)), and the second vertical power lines VPL2 may be disposed in the first conductive layer of the circuit layer PCL, and may be simultaneously formed.

In an embodiment, the semiconductor patterns SCP provided in the display area DA may be disposed in the same layer of the circuit layer PCL. For example, the semiconductor patterns SCP may be disposed in the semiconductor layer of the circuit layer PCL, and may be simultaneously formed.

In an embodiment, the gate electrodes GE, the lower electrodes LE of the capacitors Cst, and/or at least one sub-line (for example, the first sub-lines SLI1 of the vertical scan lines VSLn and VSLn+1 including the n-th scan line SLn and the (n+1)-th scan line SLn+1) provided in the display area DA may be disposed in the same layer of the circuit layer PCL. For example, the gate electrodes GE, the lower electrodes LE of the capacitors Cst, and the first sub-lines SLI1 of the vertical scan lines may be disposed in the second conductive layer (for example, a gate layer) of the circuit layer PCL, and may be simultaneously formed.

In an embodiment, the source electrodes SE, the drain electrodes DE, and the upper electrodes UE of the capacitors Cst provided in the display area DA, at least some lines extending in the second direction DR2, and/or at least one sub-line (for example, the second sub-lines SLI2 of the vertical scan lines including the n-th scan line SLn and the (n+1)-th scan line SLn+1) may be disposed in the same layer of the circuit layer PCL. For example, the source electrodes SE, the drain electrodes DE, the upper electrodes UE of the capacitors Cst, the horizontal scan lines (for example, the horizontal scan lines HSLn and HSLn+1 of the n-th scan line SLn and the (n+1)-th scan line SLn+1), the first horizontal power lines HPL1, the second horizontal power lines HPL2, and the second sub-lines SLI2 of the vertical scan lines may be disposed in the third conductive layer (for example, a source-drain layer) of the circuit layer PCL.

According to the embodiment of FIG. 6, the area occupied by each pixel circuit PXC may be reduced by efficiently disposing circuit elements and lines of the circuit layer PCL. Accordingly, the pixel PXL according to the above-described embodiment may be usefully applied to the high-resolution display device or the like in which the area of the individual pixel area PXA may be small as in the high-resolution display device DD.

Figure 7:
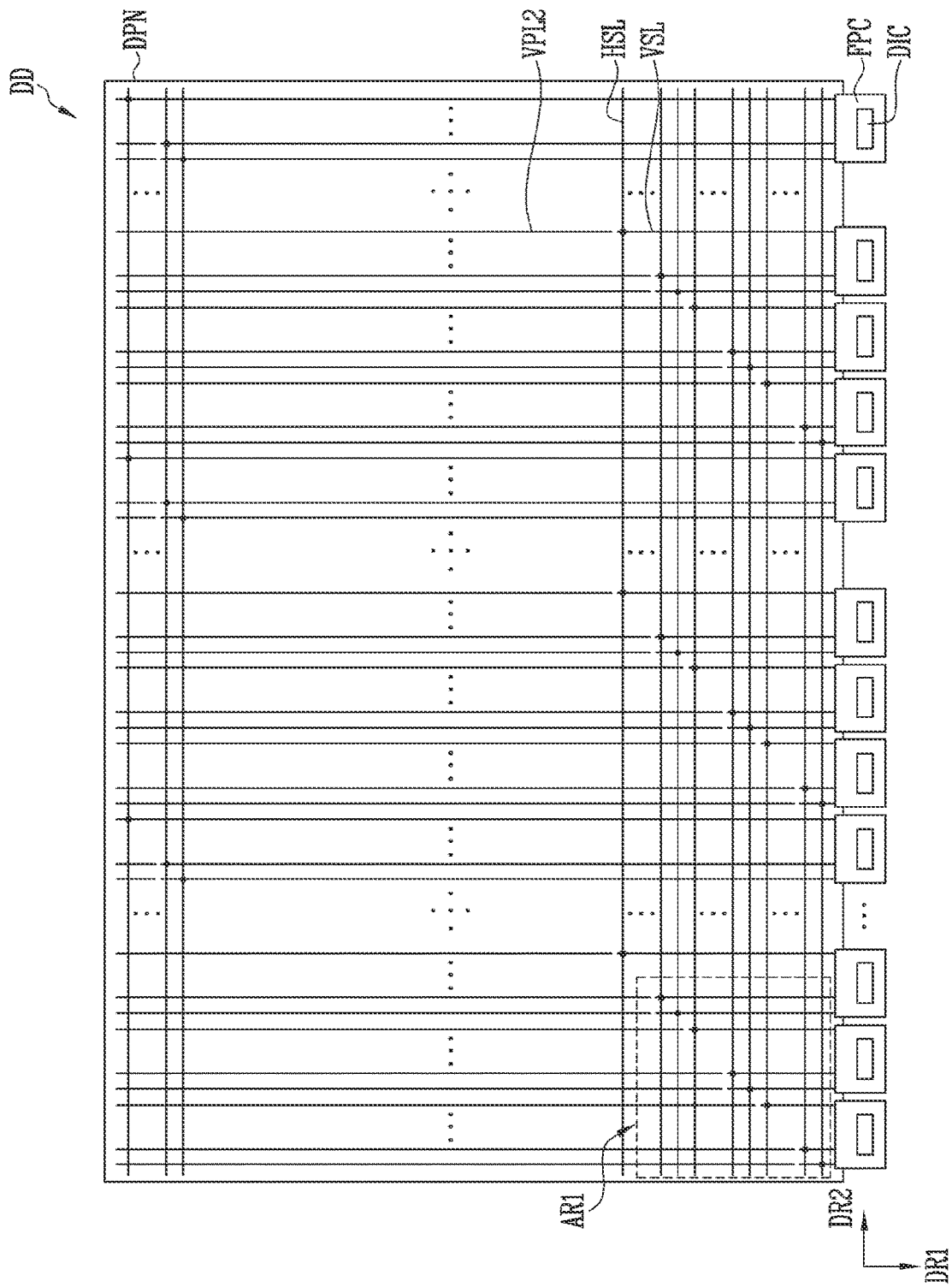
FIG. 7 is a plan view schematically illustrating a display device according to an embodiment of the disclosure.

FIG. 7 is a plan view schematically illustrating a display device DD according to an embodiment of the disclosure. For example, FIG. 7 illustrates portions of horizontal scan lines HSL, vertical scan lines VSL, and the second vertical power lines VPL2 that may be provided in the display panel DPN.

Referring to FIGS. 2 to 7, the horizontal scan lines HSL may extend along the second direction DR2 and may be electrically connected to each of the vertical scan lines VSL. For example, the horizontal scan lines HSL may be electrically connected to different vertical scan lines VSL.

The vertical scan lines VSL may extend along the first direction DR1 and may intersect each of the horizontal scan lines HSL. In an embodiment, the vertical scan lines VSL may be selectively formed only in portions necessary to connect each of the horizontal scan lines HSL and each of the circuit boards FPC. For example, the vertical scan lines VSL may be formed between each of the horizontal scan lines HSL and each of the circuit boards FPC, and may be disconnected over a point connected to each of the horizontal scan lines HSL.

In an embodiment, at least two vertical scan lines VSL adjacent to each other may be disconnected on the same horizontal line. For example, the vertical scan lines VSLn and VSLn+1 of the n-th and (n+1)-th scan lines SLn and SLn+1 may be disconnected in or around any one pixel area PXA disposed on any one horizontal line.

In an embodiment, line patterns separated from the vertical scan lines VSL while the vertical scan lines VSL may be disconnected may be utilized as the second vertical power lines VPL2. For example, line patterns disposed on substantially the same line as the vertical scan lines VSL along the first direction DR1 and separated from the vertical scan lines VSL may be connected to the adjacent second vertical power lines VPL2 and may become portions of the second vertical power lines VPL2. By the line patterns, a resistance of the second vertical power lines VPL2 may be reduced and a voltage drop of the second power VSS may be reduced or minimized. Accordingly, image quality of the display device DD may be improved.

Figure 8:
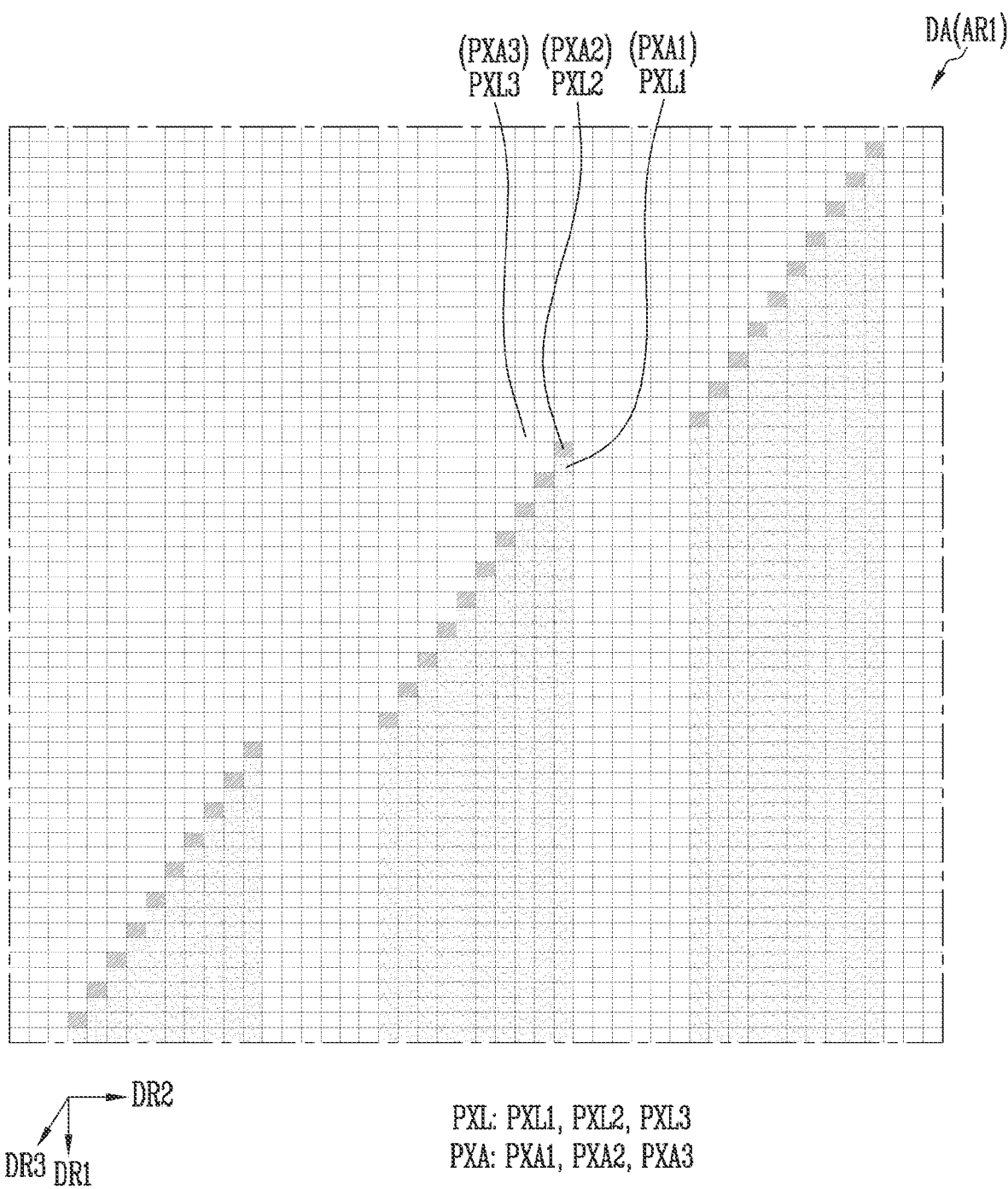
FIG. 8 is a plan view schematically illustrating a display area according to an embodiment of the disclosure.

FIG. 8 is a plan view schematically illustrating a display area DA according to an embodiment of the disclosure. For example, FIG. 8 schematically illustrates pixels PXL disposed in an area AR1 of FIG. 7 and pixel areas PXA in which the pixels PXL may be provided.

Figure 9:
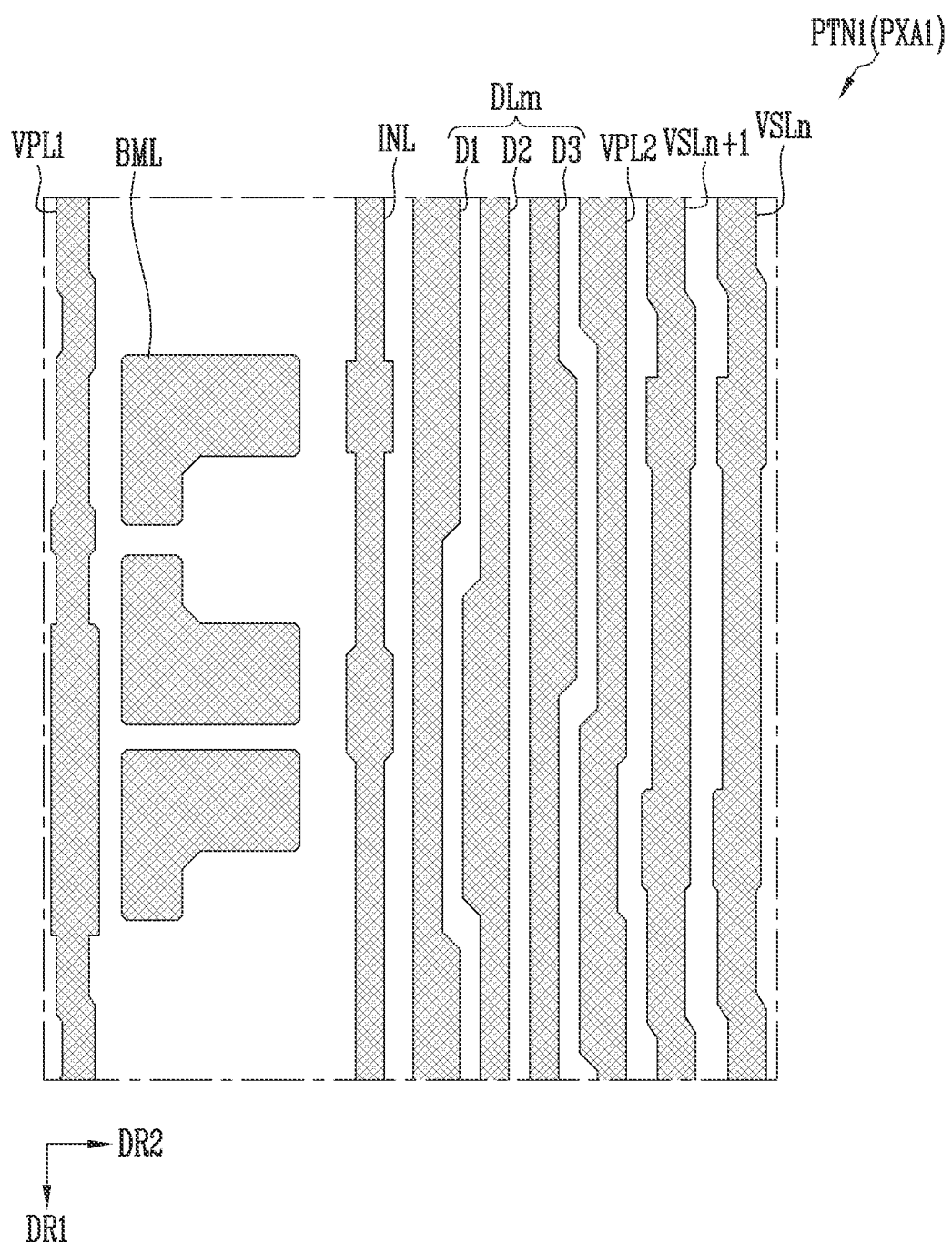
FIG. 9 is a plan view schematically illustrating first pixel patterns provided in a first pixel area of FIG. 8.
Figure 10:
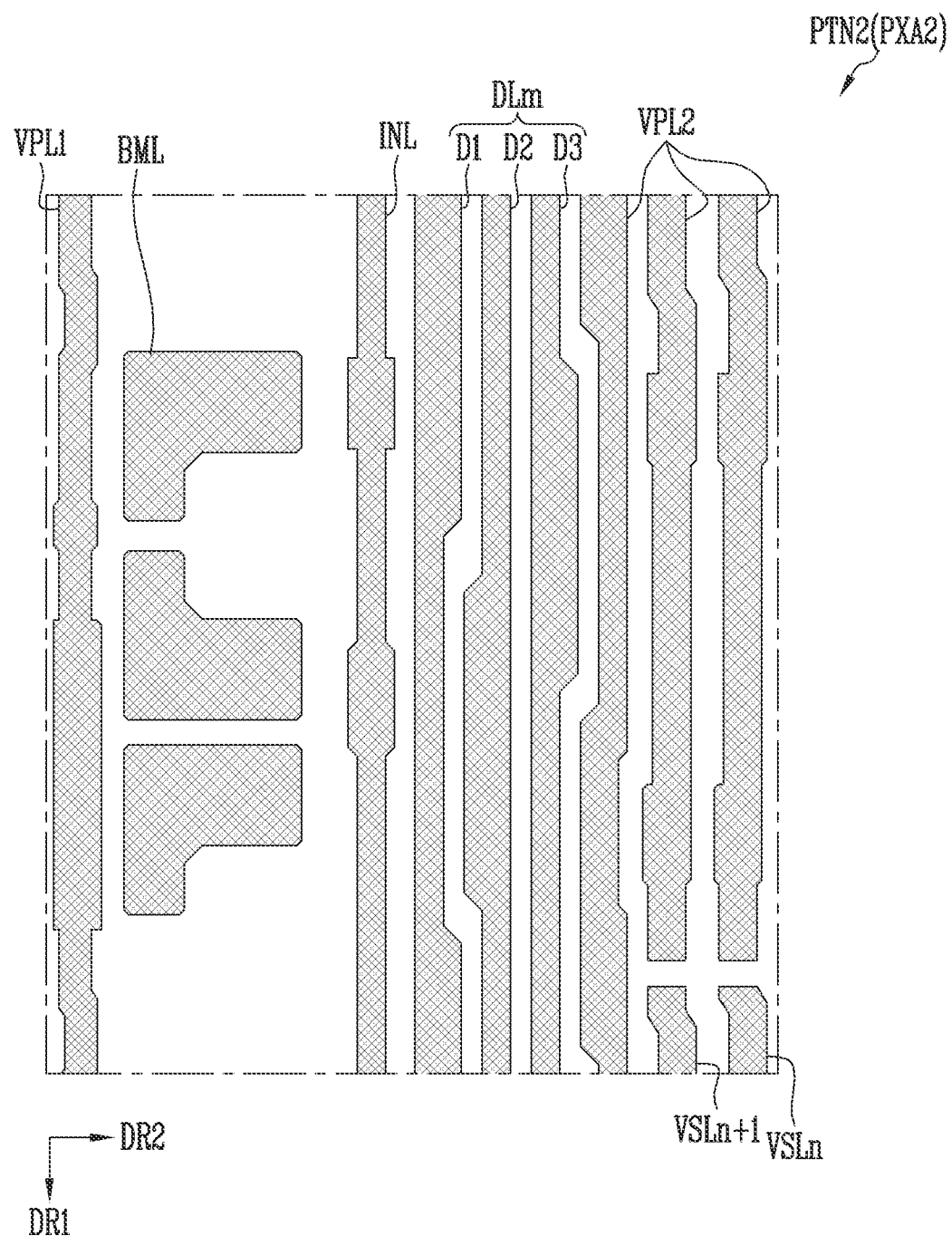
FIG. 10 is a plan view schematically illustrating second pixel patterns provided in a second pixel area of FIG. 8.
Figure 11:
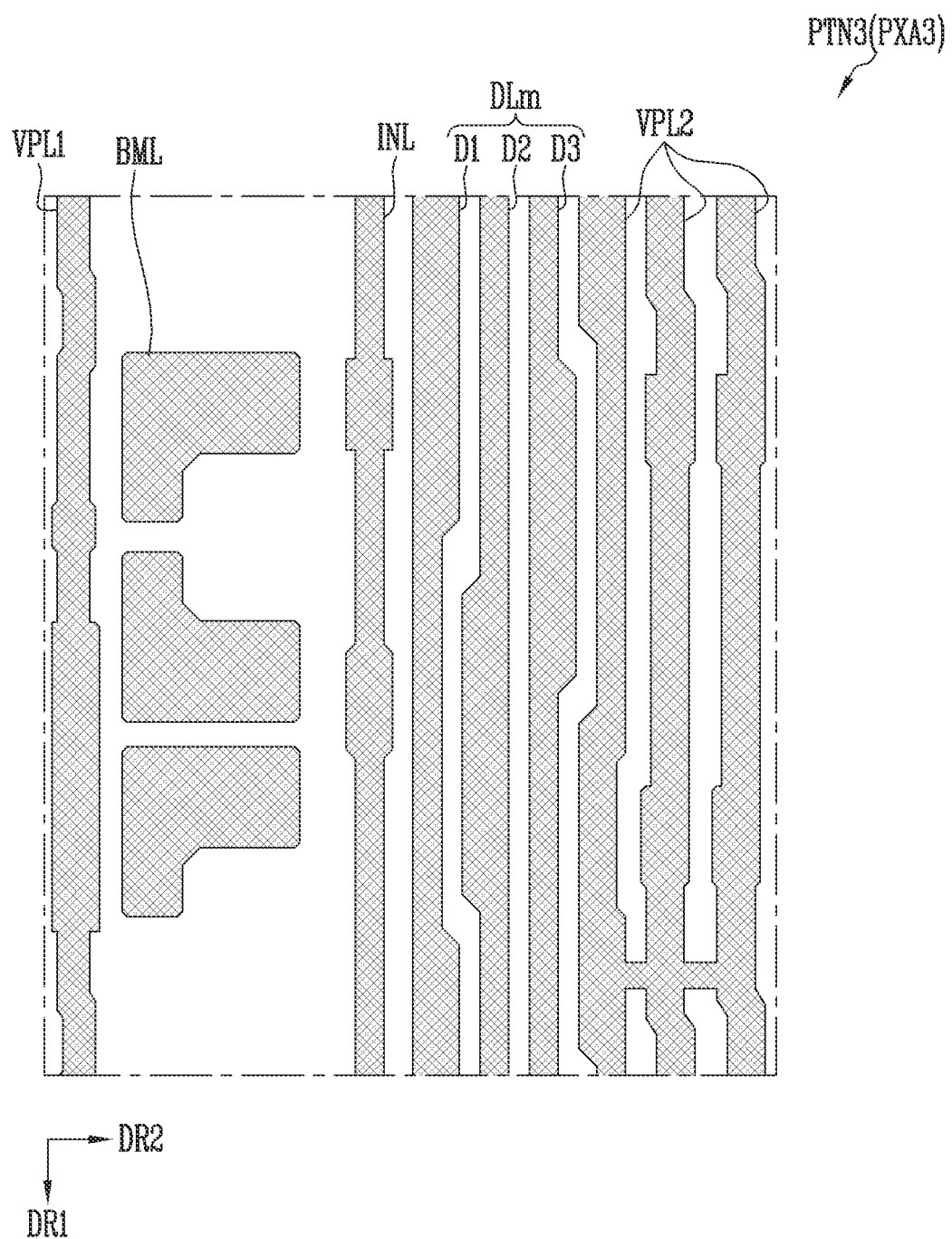
FIG. 11 is a plan view schematically illustrating third pixel patterns provided in a third pixel area of FIG. 8.

FIG. 9 is a plan view schematically illustrating first pixel patterns PTN1 provided in the first pixel area PXA1 of FIG. 8. FIG. 10 is a plan view schematically illustrating second pixel patterns PTN2 provided in a second pixel area PXA2 of FIG. 8. FIG. 11 is a plan view schematically illustrating third pixel patterns PTN3 provided in a third pixel area PXA3 of FIG. 8. For example, FIG. 9 illustrates an embodiment of conductive patterns provided in the first pixel area PXA1 and disposed and/or included in the first conductive layer described with reference to FIG. 5, FIG. 10 illustrates an embodiment of conductive patterns provided in the second pixel area PXA2 and disposed and/or included in the first conductive layer, and FIG. 11 illustrates an embodiment in which conductive patterns provided in the third pixel area PXA3 and disposed and/or included in the first conductive layer.

Referring to FIGS. 2 to 11, the pixels PXL may be provided in each of the pixel areas PXA arranged in the display area DA along the first direction DR1 and the second direction DR2. In the respective pixel areas PXA, respective pixel patterns including elements configuring the respective pixels PXL and portions of lines disposed around the pixels PXL may be disposed. For example, the display substrate 200 for forming the display panel DPN may include the pixel patterns provided in each of the pixel areas PXA.

The pixel areas PXA may include first pixel areas PXA1 in which respective first pixels PXL1 may be disposed, second pixel areas PXA2 in which respective second pixels PXL2 may be disposed, and third pixel areas PXA3 in which respective third pixels PXL3 may be disposed. The pixel patterns may include first pixel patterns PTN1 provided in the respective first pixel areas PXA1, second pixel patterns PTN2 provided in the respective second pixel areas PXA2, and third pixel patterns PTN3 provided in the respective third pixel areas PXA3.

The first pixel patterns PTN1 and the second pixel patterns PTN2 may be different from each other. For example, a pattern shape and/or a structure of the first conductive layer included in the first pixel patterns PTN1 may be at least partially different from a pattern shape and/or a structure of the first conductive layer included in the second pixel patterns PTN2.

In an embodiment, the third pixel patterns PTN3 may be different from the first pixel patterns PTN1 and the second pixel patterns PTN2. For example, a pattern shape and/or a structure of the first conductive layer included in the third pixel patterns PTN3 may be at least partially different from the pattern shape and/or the structure of the first conductive layer included in each of the first pixel patterns PTN1 and the second pixel patterns PTN2.

In an embodiment, as shown in FIG. 9, the first pixel patterns PTN1 disposed in each first pixel area PXA1 may include a portion of each of the second vertical power line VPL2 and at least one vertical scan line VSL (for example, n-th and (n+1)-th vertical scan lines VSLn and VSLn+1) each extending in the first direction DR1 and separated from each other.

In an embodiment, after a process of forming the circuit layer PCL may be completed, the first pixel area PXA1 may include pixel patterns of substantially the same or similar shape and/or structure to the pixel patterns shown in FIG. 6. For example, the first pixel patterns PTN1 may include conductive patterns configuring the pixel circuits PXC of each of the first pixels PXL1, and portions of the lines disposed around each of the first pixels PXL1.

Each of the second pixel areas PXA2 may correspond to areas in which respective vertical scan lines may be disconnected. For example, as shown in FIG. 10, the second pixel patterns PTN2 disposed in the respective second pixel areas PXA2 may include the second vertical power line VPL2 and at least one vertical scan line VSL (for example, the n-th and (n+1)-th vertical scan lines VSLn and VSLn+1) separated from each other. The at least one vertical scan line VSL may be disconnected in the second pixel area PXA2, and thus line patterns separated from the at least one vertical scan line VSL may be electrically connected to the second vertical power line VPL2 adjacent in another area (for example, in the third pixel area PXA3 on the same vertical line) to become a portion of the second vertical power line VPL2.

In an embodiment, after the process of forming the circuit layer PCL may be completed, the second pixel area PXA2 may include pixel patterns of a shape and/or a structure similar to those or that of the pixel patterns shown in FIG. 6. For example, the second pixel patterns PTN2 may include conductive patterns configuring the pixel circuits PXC of each of the second pixels PXL2, and portions of lines disposed around each of the second pixels PXL2. However, as compared to the pixel patterns shown in FIG. 6, the second pixel area PXA2 may include a portion of at least one second vertical power line VPL2 (or a sub-line corresponding thereto) at a position corresponding to at least one vertical scan line VSL (for example, the n-th and (n+1)-th vertical scan lines VSLn and VSLn+1).

In an embodiment, the second pixel areas PXA2 may be arranged and/or repeated along a third direction DR3 different from the first direction DR1 and the second direction DR2 in at least one area of the display area DA. In an embodiment, the third direction DR3 may be an oblique direction inclined with respect to the first direction DR1 and the second direction DR2.

In an embodiment, the second pixel areas PXA2 may be disposed on every horizontal line or at least every two horizontal lines. For example, the second pixel areas PXA2 may be disposed on at least some horizontal lines in a period corresponding to the number of adjacent vertical scan lines VSL that may be disconnected on the same horizontal line. For example, in case that two adjacent vertical scan lines VSL are disconnected on the same horizontal line, the second pixel areas PXA2 may be disposed on odd-numbered horizontal lines or even-numbered horizontal lines.

Each of the third pixel areas PXA3 may correspond to areas in which the vertical scan lines VSL may not be provided. For example, as shown in FIG. 11, the third pixel patterns PTN3 disposed in each of the third pixel areas PXA3 may not include the vertical scan lines VSL (for example, n-th and (n+1)-th vertical scan lines VSLn and VSLn+1) and may include the second vertical power lines VPL2 (or different portions of one second vertical power line VPL2) adjacent to each other.

The second vertical power lines VPL2 adjacent to each other may be connected to each other in at least one third pixel area PXA3. For example, the second vertical power lines VPL2 adjacent to each other may be integrally formed with each other. The second vertical power lines VPL2 adjacent to each other may also be regarded as at least two patterns configuring a portion of one second vertical power line VPL2.

In an embodiment, after the process of forming the circuit layer PCL may be completed, the third pixel area PXA3 may include pixel patterns of a shape and/or a structure similar to those or that of the pixel patterns shown in FIG. 6. For example, the third pixel patterns PTN3 may include conductive patterns configuring the pixel circuits PXC of each of the third pixels PXL3, and portions of lines disposed around each of the third pixels PXL3. However, as compared to the pixel patterns shown in FIG. 6, the third pixel area PXA3 may include at least one second vertical power line VPL2 (or a sub-line corresponding thereto) at a position corresponding to at least one vertical scan line VSL (for example, the n-th and (n+1)-th vertical scan lines VSLn and VSLn+1).

In an embodiment, the display area DA may include a vertical line on which at least one second pixel PXL2 may be disposed. The vertical line may include at least one first pixel PXL1 and at least one third pixel PXL3 disposed on different sides of the second pixel PXL2 in the first direction DR1. For example, the vertical line may include at least one first pixel PXL1 disposed at a lower end of the second pixel PXL2 and at least one third pixel PXL3 disposed at an upper end of the second pixel PXL2. In an embodiment, in the vertical lines on which the second pixels PXL2 may be disposed, an area where the first pixels PXL1 may be disposed and an area where the third pixels PXL3 may be disposed may be divided around the second pixels PXL2.

The display device DD according to the above-described embodiment may include pixel patterns (for example, the first pixel patterns PTN1, the second pixel patterns PTN2 and/or the third pixel patterns PTN3) that may not be periodic along the first direction DR1 and the second direction DR2. Accordingly, in case of comparing pixel patterns of adjacent pixels PXL based on the first direction DR1 and/or the second direction DR2, it may be difficult to smoothly perform an optical inspection on the display substrate 200. Accordingly, in the disclosure, a defect of pixel patterns may be appropriately detected, by performing an optical inspection comparing pixel patterns of adjacent pixels PXL (or adjacent pixel groups PXG) with respect to the third direction DR3 as in embodiments to be described later.

Figure 12:
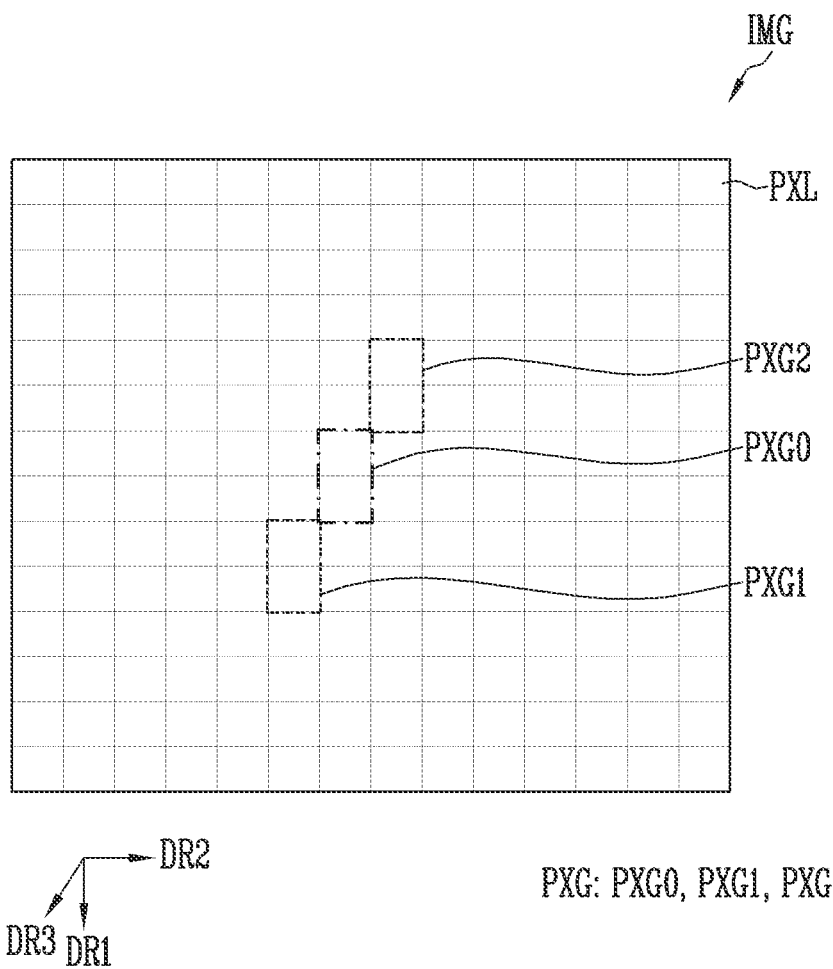
FIGS. 12 and 13 are plan views schematically illustrating a captured image for the display area and a method of inspecting a display substrate using the captured image.
Figure 13:
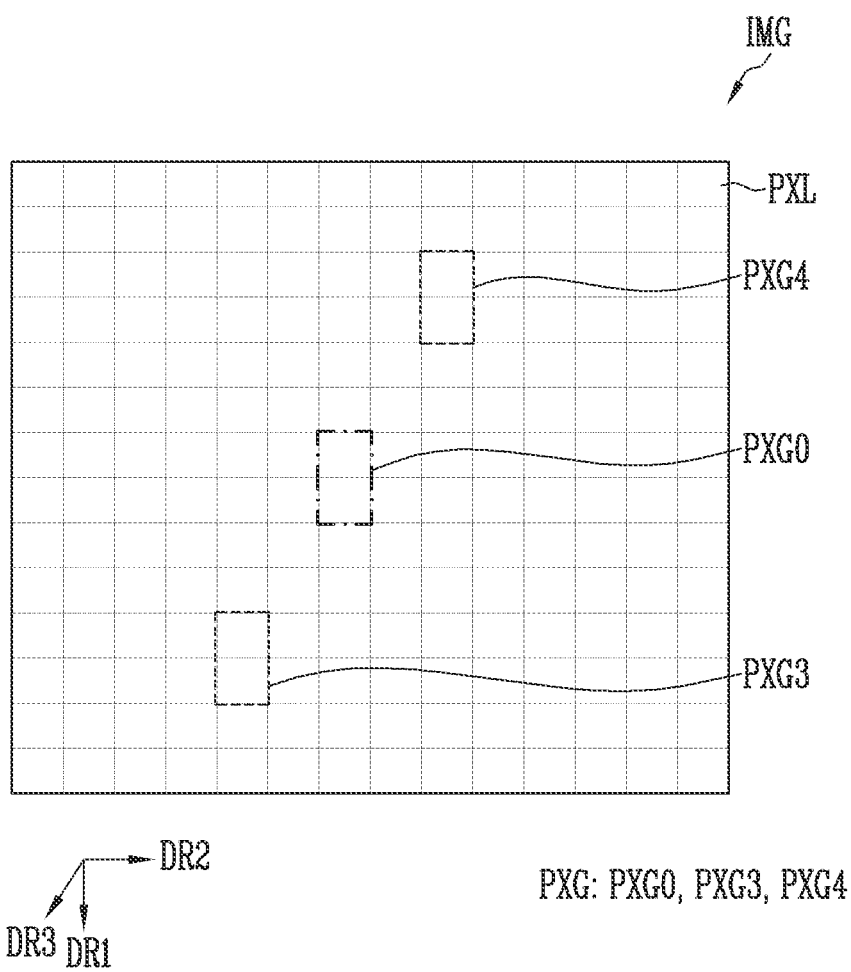

FIGS. 12 and 13 are plan views schematically illustrating a captured image IMG for the display area DA and a method of inspecting the display substrate 200 using the captured image IMG. For example, FIGS. 12 and 13 illustrates an optical inspection method of the display substrate 200 that may be provided to the display panel DPN according to the above-described embodiments.

Figure 14:
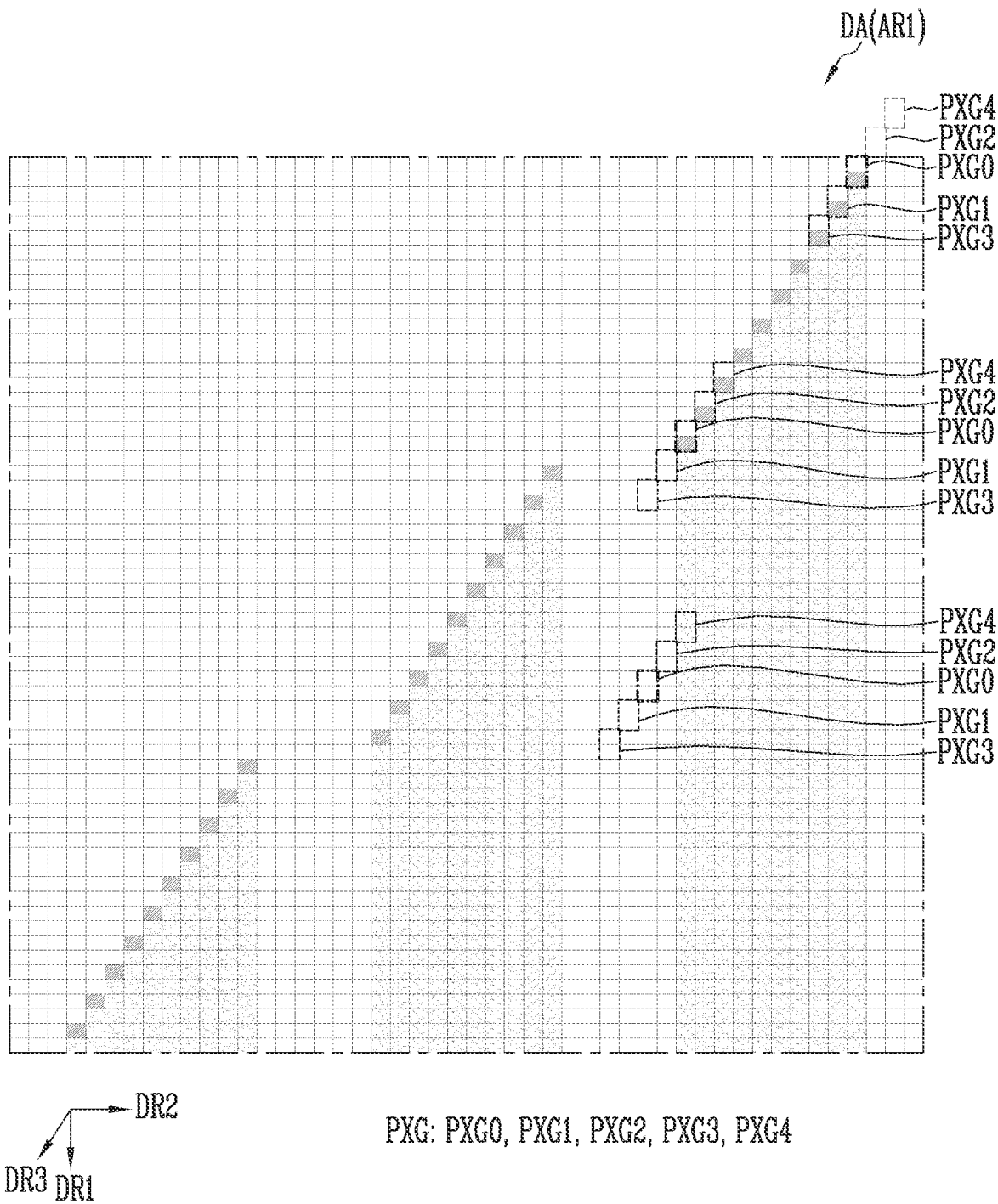
FIG. 14 is a plan view schematically illustrating a display area and a method of inspecting a display substrate including the display area according to an embodiment of the disclosure.

FIG. 14 is a plan view schematically illustrating a display area DA and a method of inspecting the display substrate 200 including the display area DA according to an embodiment of the disclosure. For example, FIG. 14 illustrates an optical inspection method of pixel patterns that may be provided in the pixels PXL (or the pixel areas PXA corresponding to the pixels PXL) disposed in the display area DA of FIG. 8.

First, referring to FIGS. 1 to 13, the captured image IMG may be obtained by imaging the display substrate 200. For example, each captured image IMG (also referred to as a "divided image") may be obtained by dividing and capturing the display area DA of the display substrate 200 for each area and/or section.

In an embodiment, a defect inspection may be performed on the pixels PXL (or each of the pixel patterns provided and/or formed in each of the pixel areas PXA corresponding to the pixels PXL) included in the captured image IMG (for example, shown in the captured image IMG), based on each captured image IMG. In an embodiment, the pixels PXL shown in the captured image IMG may be grouped, and each pixel group PXG may be designated as a target pixel group PXG0. A defect inspection on pixel patterns of the target pixel group PXG0 may be performed by comparing pixel patterns provided and/or formed in each target pixel group PXG0 (or the pixel areas PXA corresponding to the target pixel group PXG0) with pixel patterns provided and/or formed in at least one adjacent pixel group PXG (or the pixel areas PXA corresponding to the at least one adjacent pixel group PXG).

In an embodiment, each pixel group PXG may include at least two pixels PXL that may be successively and/or sequentially disposed in the first direction DR1, and may include pixels PXL of the number corresponding to the number of adjacent vertical scan lines VSL disconnected on the same horizontal line. For example, each pixel group PXG may include two pixels PXL that may be successively and/or sequentially disposed in the first direction DR1.

In an embodiment, each pixel group PXG included in the captured image IMG may be sequentially designated as the target pixel group PXG0. With respect to each target pixel group PXG0, at least one adjacent pixel group PXG may be selected as a comparison group, and defect-or-not may be determined through pixel pattern comparison.

In an embodiment, with respect to each target pixel group PXG0, first to fourth pixel groups PXG1 to PXG4 adjacent in the third direction DR3 may be selected as a comparison group for comparing pixel patterns. For example, with respect to each target pixel group PXG0, the first pixel group PXG1 and the second pixel group PXG2 positioned on both sides (for example, a lower left end and an upper right end, respectively) of the target pixel group PXG0 so as to be directly adjacent to the target pixel group PXG0 in the third direction DR3, and the third pixel group PXG3 and the fourth pixel group PXG4 positioned at a side of the first pixel group PXG1 and the second pixel group PXG2, respectively, so as to be directly adjacent to the first pixel group PXG1 and the second pixel group PXG2 in the third direction DR3, respectively, may be selected as the comparison group.

At least one of the adjacent pixel groups PXG selected as the comparison group for each target pixel group PXG0 may include pixel patterns of substantially the same shape and/or structure as the pixel patterns of the target pixel group PXG0. For example, as shown in FIG. 14, at least one of the first pixel group PXG1, the second pixel group PXG2, the third pixel group PXG3, and the fourth pixel group PXG4 may include the pixel patterns of substantially the same shape and/or structure as each target pixel group PXG0. Accordingly, an optical inspection for the pixel patterns of the target pixel group PXG0 may be appropriately performed based on the pixel patterns of the at least one adjacent pixel group PXG.

In an embodiment, the pixel patterns of the target pixel group PXG0 may be sequentially compared with pixel patterns of at least two adjacent pixel groups PXG selected as the comparison group. For example, the pixel patterns of the target pixel group PXG0 may be sequentially compared with the pixel patterns of each of the first pixel group PXG1, the second pixel group PXG2, the third pixel group PXG3, and the fourth pixel group PXG4. In a pixel pattern comparison process, in case that it is determined that the pixel patterns of the target pixel group PXG0 and the pixel patterns of any one adjacent pixel group PXG match, the pixel pattern comparison may be stopped and a defect determination step for the pixel patterns of the target pixel group PXG0 may be started based on the pixel patterns of the any one adjacent pixel group PXG. Accordingly, efficiency of an inspection process may be increased.

In an embodiment, with respect to at least one target pixel group PXG0 appearing in an edge area of the captured image IMG, the number of adjacent pixel group(s) PXG of the comparison group that may be secured in the captured image IMG may be relatively small. In an embodiment, in case that the adjacent pixel group PXG of the comparison group is not secured with respect to at least one target pixel group PXG0 appearing in the edge area of the captured image IMG, the optical inspection for the target pixel group PXG0 may be performed based on different captured images IMG including the target pixel group PXG0 and having different imaging areas and/or ranges. In an embodiment, in case that the adjacent pixel group PXG of the comparison group is not secured with respect to at least one pixel group PXG among the pixel groups PXG disposed in an outermost edge area of the display area DA, a defect of the at least one pixel group PXG may be predicted, detected, and/or determined through pre-programmed software correction.

As in the above-described embodiments, with respect to the display substrate 200 in which an aspect of pixel patterns may be changed around the second pixels PXL2, the pixels PXL may be grouped according to an arrangement structure of the second pixels PXL2 (for example, a period and/or a position in which the pixels PXL may be arranged). The comparison group for the target pixel group PXG0 may be selected based on a direction in which the second pixels PXL2 may be arranged (for example, the third direction DR3). Accordingly, the defect of the pixel patterns provided on the display substrate 200 may be readily and/or appropriately detected.

Figure 15:
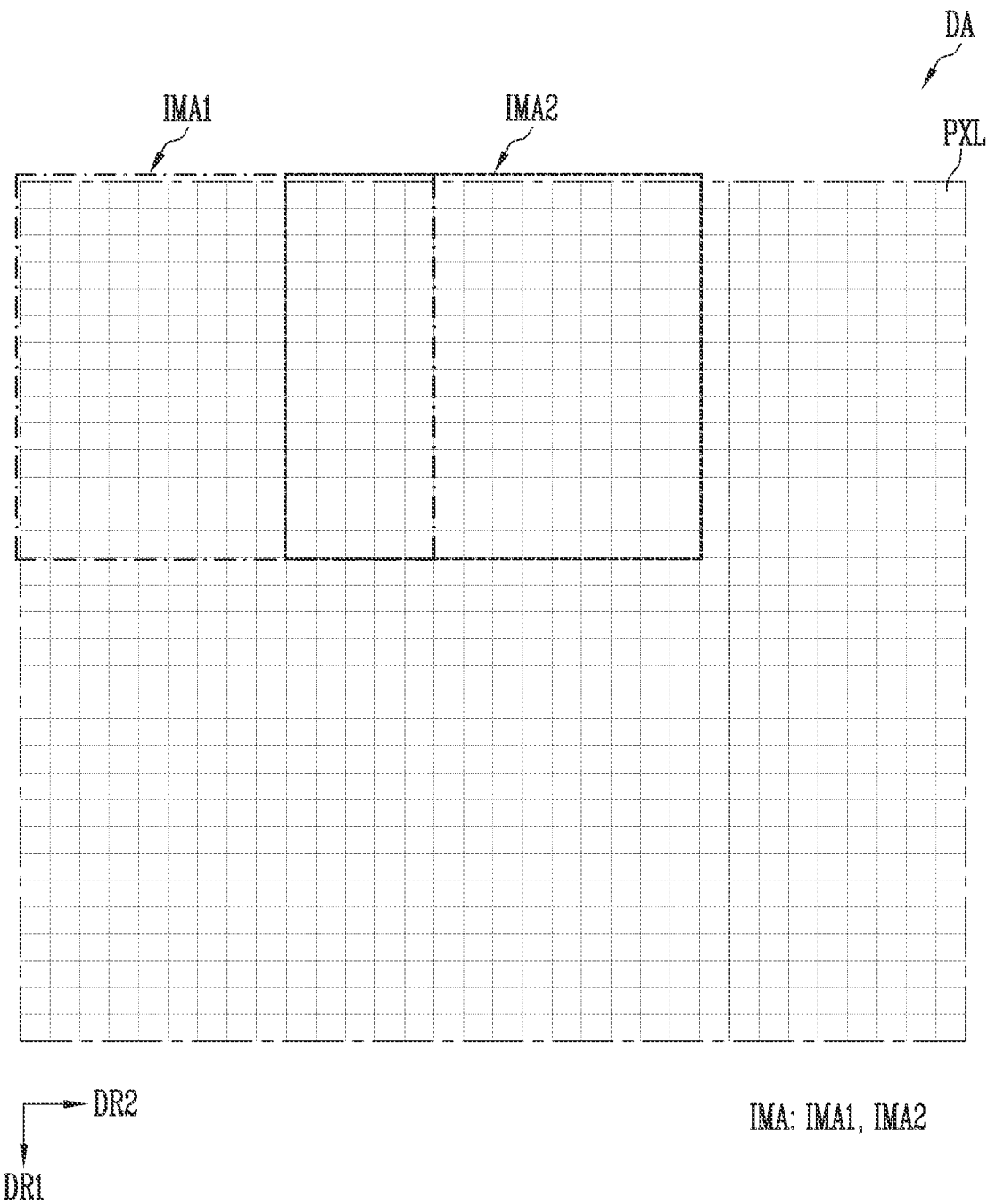
FIGS. 15 and 16 are plan views schematically illustrating a display area and a method of imaging the display area according to an embodiment of the disclosure.
Figure 16:
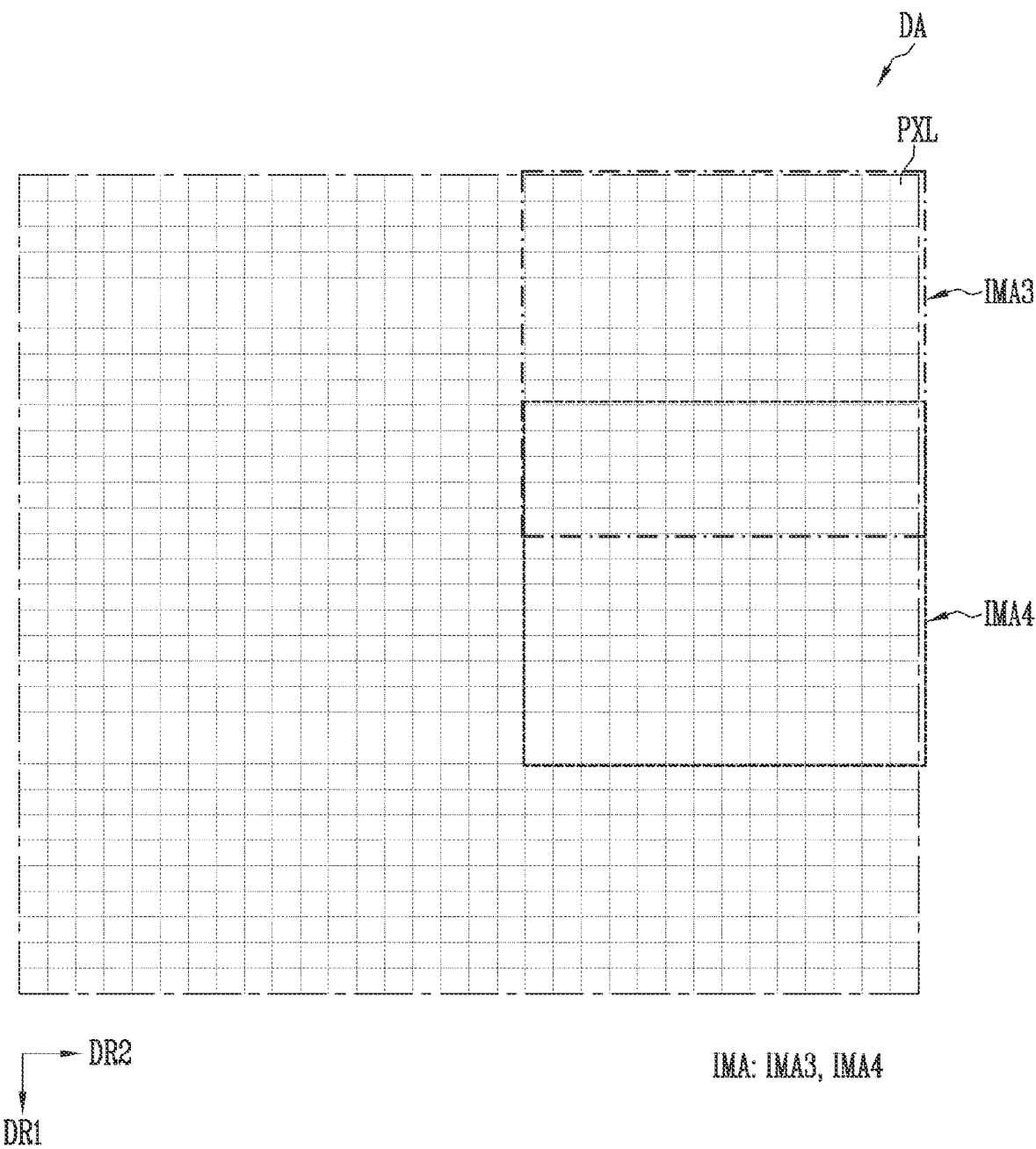

FIGS. 15 and 16 are plan views schematically illustrating a display area DA and a method of imaging the display area DA according to an embodiment of the disclosure.

Referring to FIGS. 1 to 16, in imaging the display substrate 200, the display area DA may be divided into imaging areas IMA and each of imaging areas IMA may be sequentially captured. Accordingly, the respective captured images IMG corresponding to the respective imaging areas IMA may be obtained.

For example, a first captured image may be obtained by capturing a first imaging area IMA1 corresponding to a first area of the display area DA. Thereafter, a second captured image may be obtained by capturing a second imaging area IMA2 corresponding to a second area of the display area DA. In a similar method, a third captured image may be obtained by capturing a third imaging area IMA3 corresponding to a third area of the display area DA, and a fourth captured image may be obtained by capturing a fourth imaging area IMA4 corresponding to a fourth area of the display area DA.

In an embodiment, the optical inspection for the pixel patterns may be individually performed for the respective captured images IMG corresponding to the respective imaging areas IMA. For example, it may be determined whether the pixel patterns included in the pixel groups PXG included in the first captured image are defective based on the first captured image corresponding to the first imaging area IMA1. It may be determined whether the pixel patterns included in the pixel groups PXG included in the second captured image are defective based on the second captured image corresponding to the second imaging area IMA2. The pixel groups PXG positioned in overlapping areas of the imaging areas IMA may be repeatedly inspected, and an inspection result of the pixel groups PXG may be synthesized or an overlap may be removed through pre-programmed software correction.

In an embodiment, the imaging areas IMA may be set to partially overlap each other in at least one of the first direction DR1 and the second direction DR2. For example, the first imaging area IMA1 and the second imaging area IMA2 may be sequentially disposed along the second direction DR2, and a portion may overlap each other by an area corresponding to at least one pixel PXL (or at least one pixel area PXA). For example, the first imaging area IMA1 and the second imaging area IMA2 may overlap each other by an area corresponding to several pixels PXL in the second direction DR2. The third imaging area IMA3 and the fourth imaging area IMA4 may be sequentially disposed along the first direction DR1, and a portion may overlap each other by an area corresponding to at least one pixel PXL (or at least one pixel area PXA) in the first direction DR1. For example, the third imaging area IMA3 and the fourth imaging area IMA4 may overlap each other by an area corresponding to several pixels PXL in the first direction DR1.

According to the above-described embodiments, in obtaining the captured image IMG of the pixel patterns provided in the display area DA, the display substrate 200 may be imaged so that the imaging areas IMA partially overlap each other in the first direction DR1 and/or the second direction DR2. Accordingly, the optical inspection for the entire area of the display area DA may be performed so that pixel patterns that may not be inspected (or the pixel patterns that may not be inspected may be reduced or minimized). For example, the pixel patterns provided in all pixel areas PXA over the entire display area DA may be captured, and the defect of the pixel patterns may be appropriately detected through the optical inspection for the pixel patterns.

Figure 17:
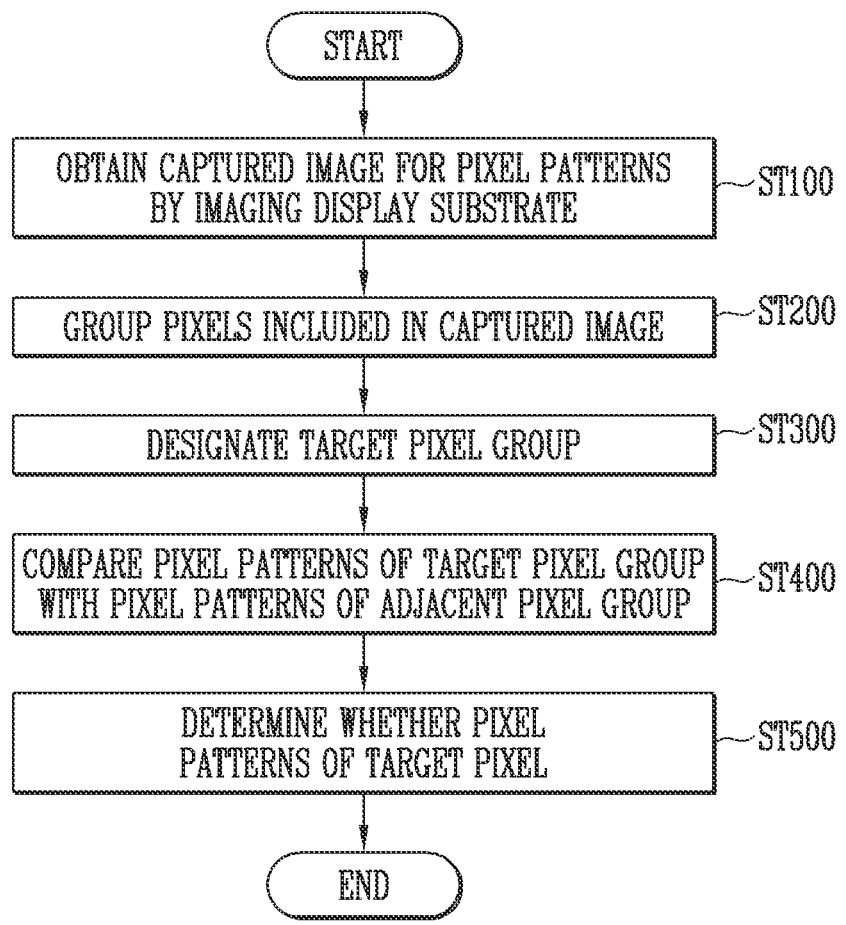
FIGS. 17 and 18 are flowcharts schematically illustrating a method of inspecting a display substrate according to an embodiment of the disclosure.
Figure 18:
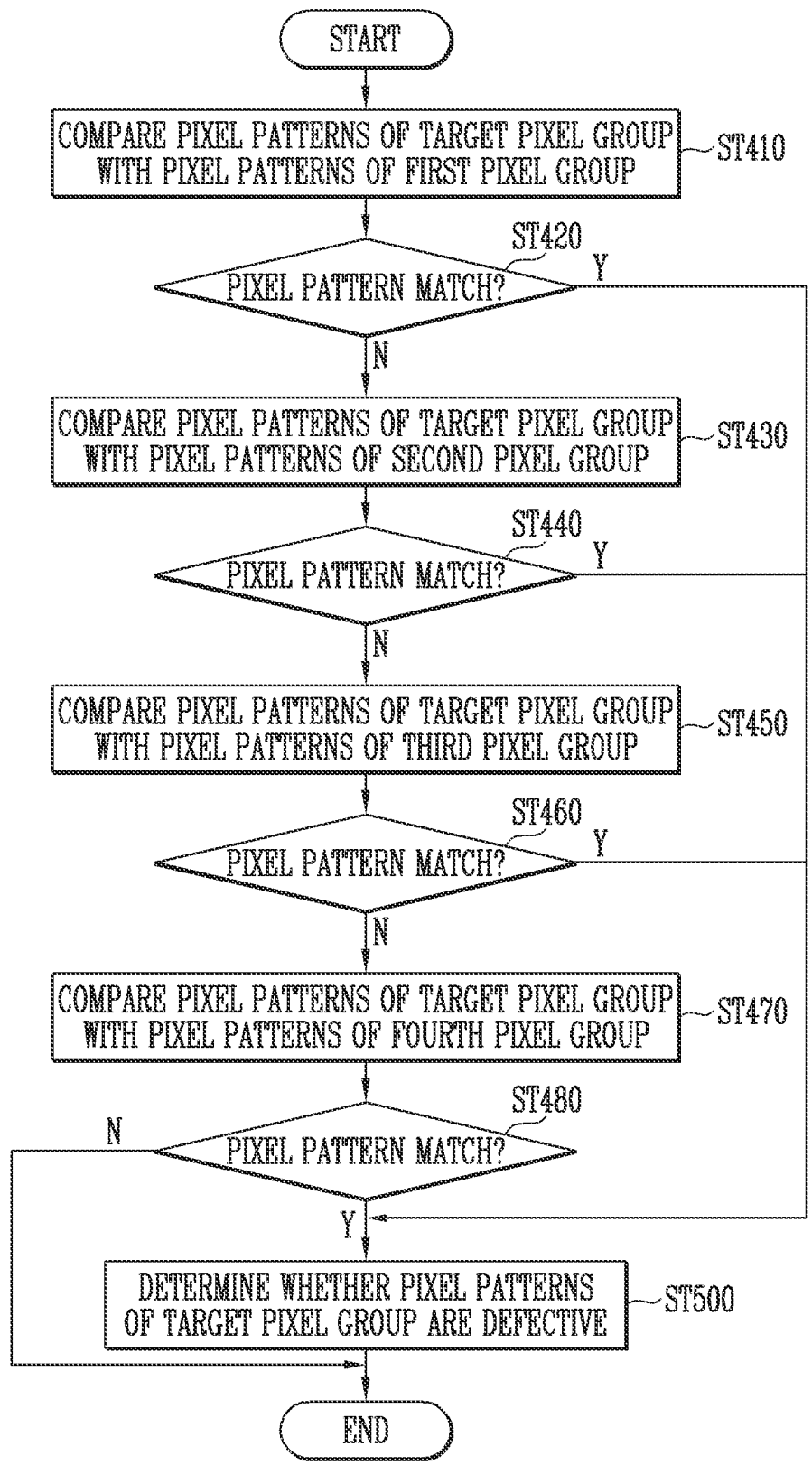

FIGS. 17 and 18 are flowcharts schematically illustrating a method of inspecting a display substrate 200 according to an embodiment of the disclosure. FIG. 18 illustrates an example of a method of inspecting the display substrate 200 corresponding to step ST400 of FIG. 17.

Referring to FIGS. 1 to 18, the captured image IMG of the pixel patterns may be acquired by imaging the display substrate 200 on which pixel patterns to be inspected may be provided and/or formed. For example, the respective captured images IMG may be obtained by imaging different areas of the display area DA corresponding to the respective imaging areas IMA (ST100).

Thereafter, the pixels PXL included (for example, captured) in each captured image IMG may be grouped. For example, with respect to the pixels PXL included in the captured image IMG, at least two pixels PXL arranged along the first direction DR1 may be grouped into one pixel group PXG to group the pixels PXL included in the captured image IMG into pixel groups PXG. In an embodiment, the pixels PXL of the number corresponding to a distance and/or a period in which the second pixels PXL2 may be arranged in the first direction DR1 (for example, two pixels PXL arranged sequentially on the same vertical line along the first direction DR1) may be grouped into a pixel group PXG (ST200).

Thereafter, the target pixel group PXG0 may be designated in each captured image IMG. For example, the pixel groups PXG included in the captured image IMG may be sequentially designated as the target pixel group (ST300).

In case that the target pixel group PXG0 is designated, the pixel patterns of the target pixel group PXG0 may be compared with the pixel patterns of at least one adjacent pixel group PXG designated as the comparison group with respect to the target pixel group PXG0. For example, the pixel patterns of the target pixel group PXG may be compared with the pixel patterns of the first pixel group PXG1, the second pixel group PXG2, the third pixel group PXG3 and/or the fourth pixel group PXG4 positioned in the third direction DR3 with respect to the target pixel group PXG0 (ST400).

In an embodiment, the pixel patterns of the target pixel group PXG0 may be sequentially compared with the pixel patterns of the first pixel group PXG1, the second pixel group PXG2, the third pixel group PXG3, and/or the fourth pixel group PXG4. In case that it is determined that the pixel patterns of the target pixel group PXG and the pixel patterns included in the pixel group PXG of the comparison group match in the pixel pattern comparison process, the pixel pattern comparison process may be stopped and a subsequent step may be performed.

For example, as shown in FIG. 18, first, the pixel patterns of the target pixel group PXG0 and the pixel patterns of the first pixel group PXG1 may be compared, and thus it may be determined whether the pixel patterns match. In an embodiment, whether the pixel patterns match may be determined according to a criterion, a matching rate of the pixel patterns, and/or the like (ST410 and ST420).

As a result of the pixel pattern comparison, in case that it is determined that the pixel patterns of the target pixel group PXG0 and the pixel patterns of the first pixel group PXG1 match, the pixel pattern comparison may be stopped. Another step (for example, determining whether the pixel patterns of the target pixel group PXG0 are defective) may be performed. For example, it may be determined whether the pixel patterns of the target pixel group PXG0 are defective based on the pixel patterns of the first pixel group PXG1 (ST500).

As a result of the pixel pattern comparison, in case that it is determined that the pixel patterns of the target pixel group PXG0 and the pixel patterns of the first pixel group PXG1 do not match, the pixel patterns of the target pixel group PXG0 and the pixel patterns of the second pixel group PXG2 may be compared, and thus it may be determined whether the pixel patterns match or not (ST430 and ST440).

As a result of the pixel pattern comparison, in case that it is determined that the pixel patterns of the target pixel group PXG0 and the pixel patterns of the second pixel group PXG2 match, the pixel pattern comparison may be stopped. It may be determined whether the pixel patterns of the target pixel group PXG0 are defective based on the pixel patterns of the second pixel group PXG2 (ST500).

As a result of the pixel pattern comparison, in case that it is determined that the pixel patterns of the target pixel group PXG0 and the pixel patterns of the second pixel group PXG2 do not match, the pixel patterns of the target pixel group PXG0 and the pixel patterns of the third pixel group PXG3 may be compared, and thus it may be determined whether the pixel patterns match or not (ST450 and ST460).

As a result of the pixel pattern comparison, in case that it is determined that the pixel patterns of the target pixel group PXG0 and the pixel patterns of the third pixel group PXG3 match, the pixel pattern comparison may be stopped. It may be determined whether the pixel patterns of the target pixel group PXG0 are defective based on the pixel patterns of the third pixel group PXG3 (ST500).

As a result of the pixel pattern comparison, in case that it is determined that the pixel patterns of the target pixel group PXG0 and the pixel patterns of the third pixel group PXG3 do not match, the pixel patterns of the target pixel group PXG0 and the pixel patterns of the fourth pixel group PXG4 may be compared, and thus it may be determined whether the pixel patterns match (ST470 and ST480).

As a result of the pixel pattern comparison, in case that it is determined that the pixel patterns of the target pixel group PXG0 and the pixel patterns of the fourth pixel group PXG4 match, the pixel pattern comparison may be stopped. It may be determined whether the pixel patterns of the target pixel group PXG0 are defective based on the pixel patterns of the fourth pixel group PXG4 (ST500).

As a result of the pixel pattern comparison, in case that it is determined that the pixel patterns of the target pixel group PXG0 and the pixel patterns of the fourth pixel group PXG4 do not match, the defect inspection for the pixel patterns of the target pixel group PXG0 may be stopped. Thereafter, a defect inspection for another target pixel group PXG0 may be started.

In case that a pixel group PXG on which the defect inspection is not completed exists among the pixel groups PXG included in each captured image IMG, the defect inspection for the pixel group PXG may be performed in an optical inspection based on another captured image IMG. In other embodiments, a defect of the pixel group PXG may be predicted, detected, and/or determined through software correction.

In accordance with the method of inspecting the display substrate 200 according to embodiments of the disclosure, the defect of the pixel patterns may be appropriately detected with respect to the display substrate 200 including the pixel patterns that may not be periodic with respect to the first direction DR1 and the second direction DR2 in which the pixels PXL may be arranged. For example, the optical inspection for the pixel patterns of the target pixel group PXG0 may be performed by grouping at least two adjacent pixels PXL (for example, two vertically adjacent pixels PXL) arranged in the first direction DR1 in the display substrate 200 and selecting at least one adjacent pixel group PXG positioned in the third direction DR3 (for example, an oblique direction in which the second pixels PXL serving as a branch point at which aspects of the pixel patterns may be different, and the second pixel areas PXA2 corresponding to the second pixels PXL2 may be arranged) with respect to each target pixel group PXG0 as the comparison group. For example, the first pixel group PXG1, the second pixel group PXG2, the third pixel group PXG3, and the fourth pixel group PXG4 adjacent to each target pixel group PXG0 in the third direction DR3 may be selected as the comparison group, and the pixel patterns of the target pixel group PXG0 may be sequentially compared with the pixel patterns of the first pixel group PXG1, the second pixel group PXG2, the third pixel group PXG3, and the fourth pixel group PXG4 until the pixel group PXG of the comparison group, which has the pixel pattern matching the pixel pattern of the target pixel group PXG0 may be detected. Whether the pixel patterns of the target pixel group PXG0 are defective, a defect position, a type or a shape of a defect and/or the like may be detected, based on the pixel patterns included in the pixel group PXG of the comparison group of which the pixel patterns are determined to match.

According to some embodiments, in obtaining the captured image IMG of the pixel patterns by imaging the display substrate 200, the display substrate 200 may be imaged so that the imaging areas IMA partially overlap each other along the first direction DR1 and/or the second direction DR2. Accordingly, the optical inspection for the entire area of the display area DA may be appropriately performed.

Although the disclosure has been specifically described according to the above-described embodiments, it should be noted that the above-described embodiments are for describing the disclosure and not for limiting the scope of the disclosure. Those of ordinary skill in the art to which the disclosure pertains will understand that various modifications are possible within the scope of the technical spirit of the disclosure.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. A method of inspecting a display substrate including pixel patterns provided in pixel areas disposed in a display area in a first direction and a second direction, the method comprising:

obtaining a captured image of the pixel patterns of the display substrate;

grouping pixels included in the captured image by grouping at least two pixels disposed in the first direction into a pixel group;

designating each pixel group included in the captured image as a target pixel group;

comparing pixel patterns of the target pixel group with pixel patterns of an adjacent pixel group positioned in a third direction with respect to the target pixel group; and determining whether the pixel patterns of the target pixel group are defective.

2. The method according to claim 1, wherein the third direction is an oblique direction inclined with respect to the first direction and the second direction.

3. The method according to claim 2, wherein
the first direction is a vertical direction of the display area, and
the second direction is a horizontal direction of the display area.

4. The method according to claim 1, wherein the adjacent pixel group comprises at least one of:
a first pixel group positioned at a side of the target pixel group to be directly adjacent to the target pixel group in the third direction;
a second pixel group positioned at another side of the target pixel group to be immediately adjacent to the target pixel group in the third direction;
a third pixel group immediately adjacent to the first pixel group in the third direction; or
a fourth pixel group immediately adjacent to the second pixel group in the third direction.

5. The method according to claim 4, wherein at least one of the first pixel group, the second pixel group, the third pixel group, or the fourth pixel group, and the target pixel group include pixel patterns of a same shape.

6. The method according to claim 5, wherein the comparing of the pixel patterns of the target pixel group with the pixel patterns of the adjacent pixel group comprises comparing the pixel patterns of the target pixel group with pixel patterns of the first pixel group to determine whether the pixel patterns match.

7. The method according to claim 6, wherein in case that the pixel patterns of the target pixel group match the pixel patterns of the first pixel group, it is determined whether the pixel patterns of the target pixel group are defective based on the pixel patterns of the first pixel group.

8. The method according to claim 6, wherein
in case that the pixel patterns of the target pixel group and the pixel patterns of the first pixel group do not match, the pixel patterns of the target pixel group are sequentially compared with pixel patterns of the second pixel group, the third pixel group, and the fourth pixel group, and
in case that the pixel patterns of the second pixel group, the third pixel group, or the fourth pixel group match the pixel patterns of the target pixel group, a pixel pattern comparison step is stopped.

9. The method according to claim 8, wherein it is determined whether the pixel patterns of the target pixel group are defective, based on the pixel patterns of the second pixel group, the third pixel group, or the fourth pixel group determined to match the pixel patterns of the target pixel group.

10. The method according to claim 1, wherein
the pixel areas include first pixel areas in which first pixels are disposed, and second pixel areas in which second pixels are disposed, and
the pixel patterns include first pixel patterns provided in the first pixel areas, and second pixel patterns provided in the second pixel areas and different from the first pixel patterns.

11. The method according to claim 10, wherein the second pixel areas are disposed in the third direction in at least one area of the display area.

12. The method according to claim 10, wherein
the pixel areas further include third pixel areas in which third pixels are disposed, and
the pixel patterns further include third pixel patterns provided in the third pixel areas and different from the first pixel patterns and the second pixel patterns.

13. The method according to claim 12, wherein
the display area includes a vertical line on which any one of the second pixels is disposed, and
the vertical line includes at least one first pixel disposed at a lower end of the one second pixel, and at least one third pixel disposed at an upper end of the one second pixel.

14. The method according to claim 12, wherein
the first pixel patterns include conductive patterns configuring a pixel circuit of each of the first pixels, and a portion of lines disposed around each of the first pixels,
the second pixel patterns include conductive patterns configuring a pixel circuit of each of the second pixels, and a portion of lines disposed around each of the second pixels, and
the third pixel patterns include conductive patterns configuring a pixel circuit of each of the third pixels, and a portion of lines disposed around each of the third pixels.

15. The method according to claim 14, wherein
the first pixel patterns include a portion of each of a vertical power line and a vertical scan line extending in the first direction and separated from each other, and
the vertical scan line is disconnected in any one of the second pixel areas.

16. The method according to claim 15, wherein the third pixel patterns include a portion of the vertical power line extending in the first direction and including at least two patterns connected to each other.

17. The method according to claim 1, wherein
the obtaining of the captured image comprises:
obtaining a first captured image of a first area of the display area; and
obtaining a second captured image of a second area of the display area, and
the first area and the second area partially overlap each other in at least one of the first direction or the second direction.

18. The method according to claim 17, wherein
it is determined whether pixel patterns included in each pixel group included in the first captured image are defective, based on the first captured image, and
it is determined whether pixel patterns included in each pixel group included in the second captured image are defective, based on the second captured image.

19. The method of claim 1, wherein
the pixel areas include pixels, and
the pixel patterns include conductive patterns configuring a pixel circuit of each of the pixels, and a portion of lines disposed around each of the pixels.

20. The method of claim 1, wherein the captured image being an image of a structure of pixels in the pixel areas and not an image produced by the pixel areas.

21. The method of claim 1, wherein
the display substrate being a thin film transistor substrate,
the pixel patterns each include circuit elements and conductive patterns in the pixel areas, and
the determining whether the pixel patterns of the target pixel group are defective includes determining whether there are defects in the conductive patterns in and about pixels based on the comparing.

* * * * *